United States Patent [19]
Young

[11] Patent Number: 6,012,107
[45] Date of Patent: Jan. 4, 2000

[54] HARDWARE CONTROL BLOCK DELIVERY QUEUES FOR HOST ADAPTERS AND OTHER DEVICES WITH ONBOARD PROCESSORS

[75] Inventor: B. Arlen Young, Palo Alto, Calif.

[73] Assignee: Adaptec, Inc., Milpitas, Calif.

[21] Appl. No.: 08/862,143

[22] Filed: May 22, 1997

[51] Int. Cl.[7] .................................................. G06F 9/00
[52] U.S. Cl. .............................. 710/39; 710/36; 710/22; 710/24
[58] Field of Search ...................... 304/138; 395/200.36, 395/200.42, 292, 500, 72, 825, 875; 711/4; 710/22, 24, 36

[56] References Cited

U.S. PATENT DOCUMENTS

| | | | |
|---|---|---|---|
| 4,543,626 | 9/1985 | Bean et al. ................................ | 364/200 |
| 4,601,586 | 7/1986 | Bahr et al. .......................... | 395/200.36 |
| 4,615,001 | 9/1986 | Hidgins, Jr. .............................. | 395/672 |
| 4,682,284 | 7/1987 | Schrofer .................................. | 395/875 |
| 4,930,069 | 5/1990 | Batra et al. .......................... | 395/200.42 |
| 4,939,644 | 7/1990 | Harrington et al. ..................... | 395/825 |
| 4,975,829 | 12/1990 | Clarey et al. ........................... | 395/500 |
| 4,980,852 | 12/1990 | Giroir et al. ............................ | 364/900 |
| 5,459,839 | 10/1995 | Swarts et al. ........................... | 395/292 |
| 5,548,795 | 8/1996 | Au .......................................... | 395/872 |
| 5,606,679 | 2/1997 | Cohn et al. ................................. | 711/4 |
| 5,619,685 | 4/1997 | Schiavone ................................ | 395/500 |
| 5,652,913 | 7/1997 | Crick et al. .............................. | 395/856 |
| 5,680,303 | 10/1997 | Libucha et al. ......................... | 364/138 |
| 5,729,681 | 3/1998 | Aditya et al. ........................ | 392/200.1 |
| 5,745,785 | 4/1998 | Shoji et al. .............................. | 395/827 |
| 5,781,199 | 7/1998 | Oniki et al. .............................. | 345/505 |

*Primary Examiner*—Thomas C. Lee
*Assistant Examiner*—Mohamed Mashaal
*Attorney, Agent, or Firm*—Forrest Gunnison

[57] ABSTRACT

A method for queuing hardware control blocks for a system including a host microprocessor and a plurality of devices that each includes an onboard sequencer is based on a single host endless new hardware control block queue in a host memory that is managed such that the host endless new hardware control block queue never goes empty. Each device, that is coupled to the host microprocessor by an I/O bus, also has a device endless new hardware control block queue in a common hardware control block array. These device endless new hardware control block queues are managed such that the queues never are empty. A single device on the bus fetches hardware control blocks from the host endless hardware control block queue and loads the hardware control blocks in the common hardware control block array. The other devices on the I/O bus do not participate in the transfer of hardware control blocks to the common hardware control block array.

23 Claims, 16 Drawing Sheets

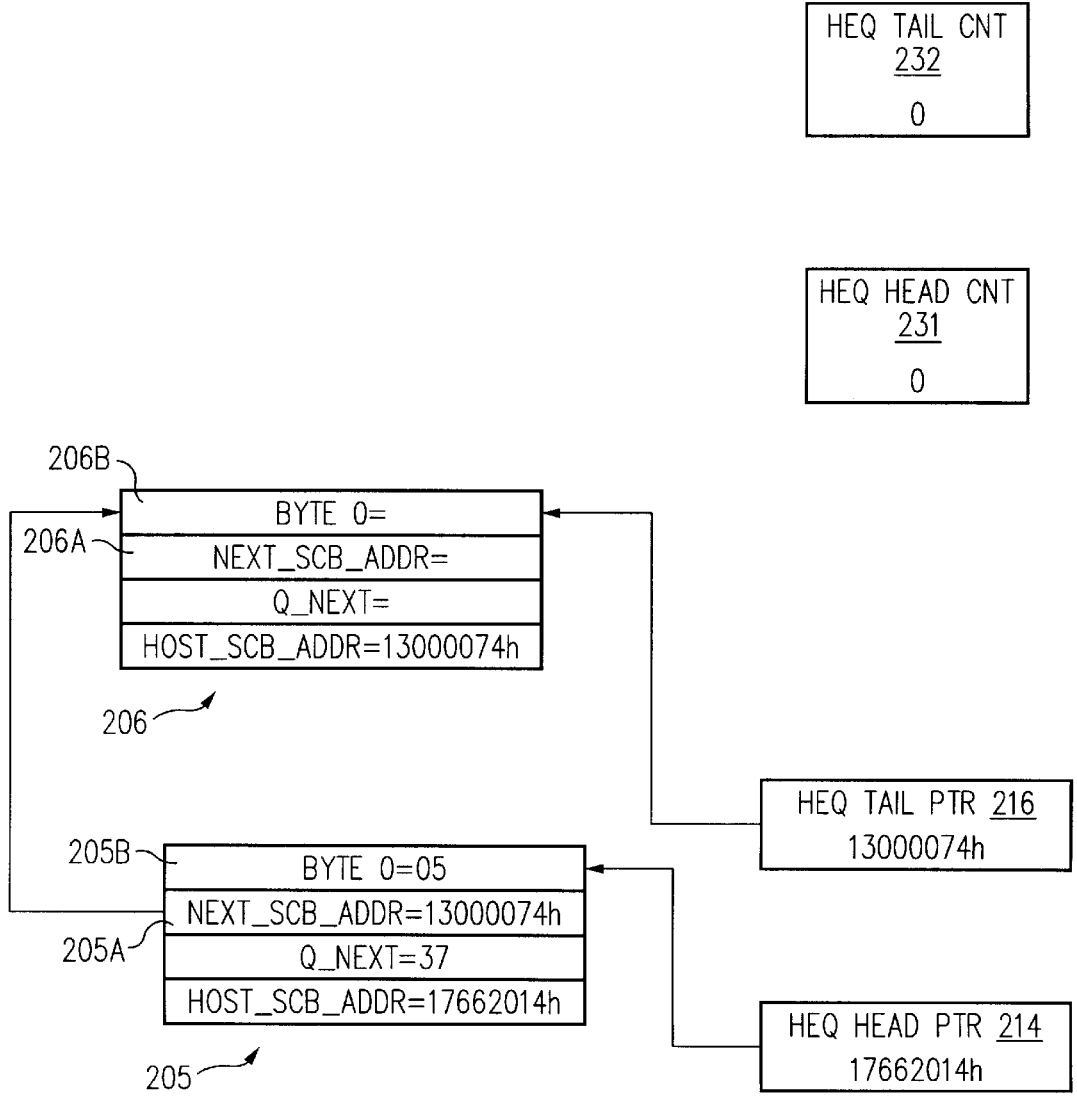

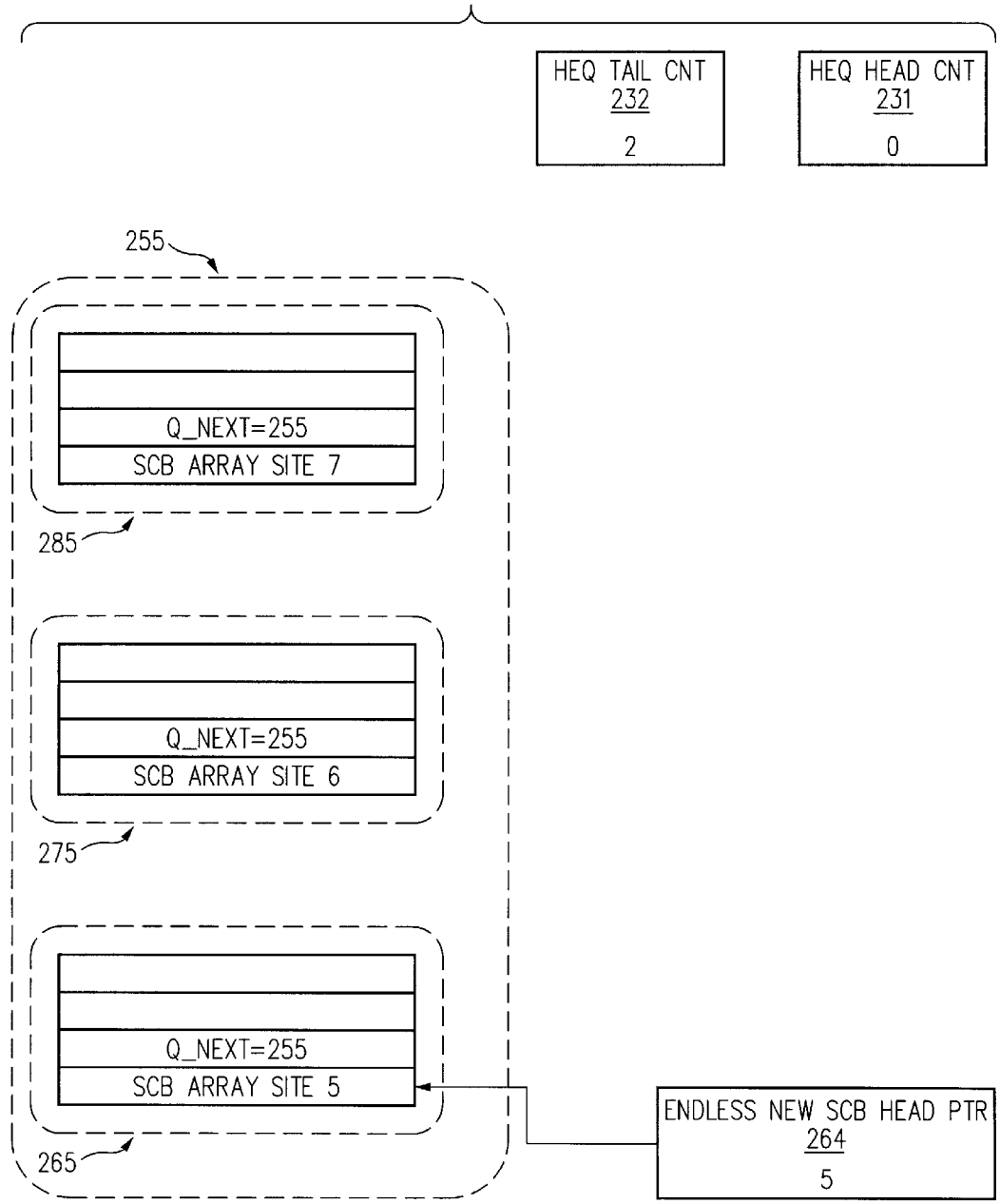

HARDWARE CONTROL BLOCK DELIVERY QUEUES FOR HOST ADAPTERS AND OTHER DEVICES WITH ONBOARD PROCESSORS

BACKGROUND OF THE INVENTION

1. Field of the Invention

The present invention is related generally to communications with host adapter integrated circuits, and in particular to methods of queuing hardware control blocks that are used in communicating tasks to one or more host adapter integrated circuits, or other devices.

2. Description of Related Art

Hardware control blocks, sometimes called sequencer control blocks or SCSI control blocks (SCBs), are typically used for transferring information between a software host adapter device driver in a host computer and a host adapter integrated circuit that controls operations of one or more peripheral devices. Methods for queuing SCBs are known to those of skill in the art. For example, see copending and commonly assigned U.S. patent application Ser. No. 07/964,532 entitled "Intelligent SCSI Bus Host Adapter Integrated Circuit," of Craig A. Stuber et al. filed on Oct. 16, 1992, which is incorporated herein by reference in its entirety. See also copending and commonly assigned U.S. patent application Ser. No. 08/269,491 entitled "A Sequencer Control Block Array External To A Host Adapter Integrated Circuit" of B. Arlen Young, et al. filed on Jun. 30, 1994, and also U.S. Pat. No. 5,564,023 entitled "Method for Accessing A Sequencer Control Block By A Host Adapter Integrated Circuit" of B. Arlen Young issued on Oct. 8, 1996, each of which is incorporated herein by reference in its entirety.

Typically, the software host adapter device driver, that transmits SCBs to the host adapter integrated circuit, included an operating system specific module (OSM) and a hardware interface module (HIM) that both were maintained in the host computer system. The OSM knew nothing about the hardware in the host adapter integrated circuit and communicated with both the host computer operating system and the HIM. The HIM communicated only with the host adapter integrated circuit and the OSM. The OSM provided information for use in a SCB and sent that information to the HIM, which in turn built a SCB. Alternative methods for queuing the SCBs by the HIM and the host adapter integrated circuit are described in the patents referenced above and so are not repeated herein.

In FIG. 1, an operating system executing on a host computer microprocessor 105, e.g., an Intel Pentium microprocessor, receives a command for a disk drive, e.g., a virtual disk drive read command or a virtual disk drive write command to a RAID system 170, from an application also executing on microprocessor 105. In response to the command, the operating system calls a device driver 103 that includes an OSM 101 and a HIM 102, both of which execute on microprocessor 105.

OSM 101 sends information necessary to implement the command to HIM 102 and in turn transfers control to HIM 102. HIM 102 includes the information received from OSM 101 in a SCB or SCBs, that are built by HIM 102, to implement the command.

HIM 102 manages a plurality of host adapter devices 120, 130, and a buffer memory controller device 140 that are on an I/O bus, which in this embodiment is a PCI bus 111. HIM 102 configures each SCB for execution by a particular one of these devices. PCI bus 111 is coupled to microprocessor 105 by a PCI bus interface circuit 110.

Buffer memory controller device 140 is, for example, an Adaptec AIC 7810 host adapter integrated circuit, while host adapter devices 120 and 130 are each an Adaptec AIC-7880 host adapter integrated circuit. Each of host adapter integrated circuits 120, 130, and buffer memory controller device 140 includes an on-board processor, i.e., sequencers 125, 135 and 145, respectively, and scratch memory 126, 136, and 146, respectively. Each of devices 120, 130, and 140 also includes a queue-in FIFO register 127, 137, and 147, respectively. Each of queue-in FIFO registers 127, 137, and 147 (an hold up to 256 pointers to SCB storage sites in a SCB array 155 stored in an external memory 150. HIM 102 can access memory 150 over bus 111, and through any one of device 120, 130, and 140.

Task requests from HIM 102 to host adapter devices 120, 130, and buffer memory controller device 140 are made via the SCBs. In this embodiment, HIM 102 writes the SCBs to one of 256 sites of SCB array 155 (FIG. 1) in random access memory (RAM) 150. The size of each site is 32 bytes. Each SCB written to a site in RAM 150 is executed by a sequencer in one of devices 120, 130, and 140. Similarly, when execution of the SCB is completed, HIM 102 receives the completed SCB from the site in RAM 150.

Specifically, HIM 102 builds each SCB in memory 104. To deliver a SCB to a device, e.g., host adapter device 120, HIM 102 first pauses the sequencer, e.g., sequencer 125, which halts execution of whatever the sequencer may be processing. After sequencer 125 is paused, HIM 102 transfers the SCB from host memory 104 to a SCB storage site, e.g., SCB site thirty-seven, of a shared SCB array 155 in external memory 150 using a programmed I/O (PIO) over bus 111. HIM 102 also transfers a pointer to the SCB storage site using a PIO transfer over bus 111 to queue-in-FIFO register 127. After the pointer is transferred to queue-in-FIFO register 127, HIM 102 unpauses sequencer 125 so that sequencer 125 can resume execution of the paused process.

When host adapter device 120 is idle, sequencer 125 checks queue-in-FIFO register 127 to determine whether queue-in-FIFO register 127 is empty. If queue-in-FIFO register 127 is not empty, one or more SCBs are in SCB array 155 for execution by host adapter device 120. In this event, sequencer 125 pops a pointer off queue-in-FIFO register 127 and begins execution of the SCB addressed by the pointer. Upon interruption or completion of the execution of the SCB, sequencer 125 checks queue-in-FIFO register 127 again. This sequence of actions is repeated until queue-in-FIFO 127 is empty.

The operations described above for host adapter device 120 are also performed by devices 130 and 140. The PIO transfers of the SCBs and the pointers require a considerable amount of execution time on host microprocessor 105. Also, the device sequencer may be stopped for the PIO transfer at an inconvenient time, which in turn results in noticeable delays on the SCSI bus, e.g., SCSI bus 121 or SCSI bus 131.

Also, in some applications, HIM 102 builds a chain of SCBs to implement a particular virtual disk drive command. See for example, copending and commonly assigned U.S. patent application Ser. No. 08/617,990 entitled "Method for Specifying A Sequence of Execution of I/O Command Blocks In A Chain Structure" of B. Arlen Young filed on Mar. 15, 1996 which is incorporated herein by reference in its entirety.

While chaining provides significant performance advantages, the PIO transfers degrade the performance of host microprocessor 105. One way to remove the performance degradation would be to have each device perform a DMA transfer of the SCBs in the chain that are executed by the device. Use of DMA transfers eliminates the host microprocessor performance degradation associated with the PIO transfers. However, with DMA transfers, as explained more completely below, a race condition can arise when a SCB for a device is transferred to SCB array 155 using that device.

A chain of SCBs cannot begin execution until the head SCB of the chain is executed. However, when the head SCB completes execution, the subsequent SCB or SCBs in the chain that are enabled for execution upon completion of execution of the head SCB must be in SCB array 155.

Unfortunately, it is not possible to predict when the head SCB will complete execution, or when remaining SCBs of a chain will be delivered by any other device to SCB array 155. Consequently, a race condition can develop in system 170 with respect to loading SCBs in a chain into SCB array 155 when each device is responsible for the DMA transfer of the SCBs in the chain that are subsequently executed by that device.

If the possibility of such a race condition could be eliminated, it would assure the functionality of chaining of SCBs. Also, since the operations being performed are typically associated with managing user data, a SCB queue management method that is reliable, and reduces host microprocessor processing time also is desirable. Unfortunately, with the current methods, only PIO transfers can assure that chaining functions correctly and so the processing time on the host microprocessor for the PIO transfers is also necessary.

SUMMARY OF THE INVENTION

In accordance with the principles of this invention, a method for queuing hardware control blocks, such as SCBs, for a system including a host processor coupled to a plurality of devices, that may include host adapter devices and a buffer memory controller device, by an I/O bus is based on use of a host endless hardware control block queue, and a plurality of device endless hardware control block queues, one for each device. The endless hardware control block queues of this invention are managed such that the queues never are empty A device driver executing on the host processor places each new hardware control block in a tail site of the host endless new hardware control block queue. A hardware control block transfer process executing on one of the devices on the I/O bus transfers each hardware control block in turn from the host endless new hardware control block queue to a predefined location in a hardware control block array.

The hardware control block array is accessible by each of the devices on the I/O bus. The predefined location for a hardware control block in the common hardware control block array is specified within the hardware control block being transferred in a queue site field. In one embodiment, each device on the I/O bus has a device endless hardware control block queue within the common hardware control block array, and each hardware control block is placed in a tail site of one of the device endless hardware control block queues.

The use of a single device to control the transfers of hardware control blocks for all the devices to the common hardware control block array has several advantages over the prior art system. First, the device driver executing on the host processor is relieved of delivering hardware control blocks to the common hardware control block array. Consequently, the execution time on the host microprocessor associated with the prior art PIO transfers is no longer required, and so utilization of the host processor is significantly reduced in comparison to the prior art system.

Second, the devices on the I/O bus, other than the device controlling the transfers, are never paused during the delivery of hardware control blocks to the common hardware control block array. Thus, time delays during critical operations controlled by the devices are avoided. In addition, any pause of the device controlling the transfer of hardware control blocks from the host endless hardware control block queue to the array is much shorter that the prior art pause for a PIO transfer. Consequently, the overall performance of the system utilizing this invention is improved in comparison to prior art systems.

Third, the use of a single device to control the hardware control blocks means that there is only a single delivery path to the common hardware control block array. This novel method for transferring and managing hardware control blocks eliminates any possibility of a race condition associated with chaining. Specifically, the use of a single hardware control block delivery path insures that the hardware control blocks are received in the array in the same order that the hardware control blocks are placed in the host endless hardware control block queue by the device driver.

According to the principles of this invention, the hardware control blocks for a plurality of devices, where each device includes a device processor, are managed by placing each hardware control block in a host endless hardware control block queue in a host memory. A first pointer to the host endless hardware control block queue is maintained in a memory that is not within the memory space of the device processor. A second pointer to the host endless hardware control block queue is maintained in a memory addressable by the device processor. In one embodiment, the first and second pointers address the tail and head hardware control block sites of the host endless hardware control block queue.

In view of the storage locations of the pointers, only a process executing on the host processor can update the first pointer, and only a process executing on the device processor can update the second pointer. Each hardware control block storage site includes a next hardware control block address field that can be read by both of these processes, but only the process appending a hardware control block site to the host endless queue can modify the next hardware control block address field.

Hence, according to the principles of this invention, all of the host endless hardware control block queue delimiters are not maintained and defined for both a device driver that executes on the host processor, and a process that executes on the device processor of the one of the devices coupled to the host processor by the I/O bus.

A new hardware control block, referred to as the current hardware control block, is loaded by the device driver in a tail hardware control block storage site of the host endless new hardware control block queue, that is addressed by the tail pointer for host endless new hardware control block queue. The device driver allocates a new hardware control block storage site for the host endless new hardware control block queue, and sets a next hardware control block address field in the tail hardware control block, i.e., the current hardware control block, to address a new tail hardware control block storage site for the host endless new hardware control block queue.

The device driver reads a device endless queue tail pointer in the host memory to obtain a pointer to the tail site of the device endless hardware control block queue in the common hardware control block array. The device driver loads the pointer in a queue site field of the current hardware control block. The device driver also allocates a new hardware control block storage site in the device's endless hardware control block queue. The device driver loads a pointer to this site in a next queue site field of the current hardware control block and loads this pointer in the device's endless queue tail pointer Finally, the device driver updates the host tail hardware control block pointer to point to the hardware control block storage site so that the hardware control block storage site becomes the tail hardware control block storage site of the host endless hardware control block queue. The device driver also updates a count of the number of hardware control blocks appended to the host endless new hardware control block queue.

The hardware control block transfer process executing on the device sequencer that transfers the hardware control blocks from the host endless hardware control block queue to the specified storage site in the common hardware control block array can read the count of the number of hardware control blocks appended to the host endless new hardware control block queue, i.e., a first count. The hardware control block transfer process changes a second count each time a hardware control block is removed from the host endless hardware control block queue. When the first and second counts are unequal, the hardware control block transfer process transfers the hardware control block at the head of the host endless queue to the common hardware control block array.

The device endless hardware control block queue in the common hardware control block array is scanned by a process executing on the device processor of one device in the plurality of devices to determine whether the endless new hardware control block contains a hardware control block that can be executed. When the scan detects a hardware control block that can be executed, the head hardware control block pointer is unchanged by the process executing on the device processor of one device, when the hardware control block that can be executed is stored in a hardware control block storage site other than the hardware control block storage site addressed by, e.g., pointed to, or addressed using the head hardware control block pointer. In this case, the executable hardware control block is removed from the endless new hardware control block queue for execution, and the endless new hardware control block queue is mended.

When the scan detects a hardware control block that can be executed, and that is stored in a hardware control block storage site addressed by, e.g., pointed to, the head hardware control block pointer, the executable hardware control block is removed from the endless new hardware control block queue. The head hardware control block pointer is updated by the process executing on the device processor of one device when (i) the endless new hardware control block queue contains a hardware control block that can be executed, and (ii) the hardware control block that can be executed is stored in a hardware control block storage site pointed to by the head hardware control block pointer.

The methods of this invention are particularly useful for systems that have a hardware control block delivery path that is shared with data transfers, and traffic along the delivery path associated with hardware control blocks must be minimized. The methods also provide a mechanism whereby the device driver can notify the one device processor, that is controlling transfer of the hardware control blocks, of a new hardware control block in the host endless hardware control block queue without pausing that device processor and without the device processor having to poll registers external to the device.

BRIEF DESCRIPTION OF THE DRAWINGS

FIGS. 4A to 4D illustrate selected states of a host endless new SCB queue when SCBs are added to that queue according to the principles of this invention.

FIGS. 6A to 6C illustrate selected states of an endless new SCB queue in a common SCB array when SCBs are added to that queue according to the principles of this invention.

DETAILED DESCRIPTION

Figure 1:
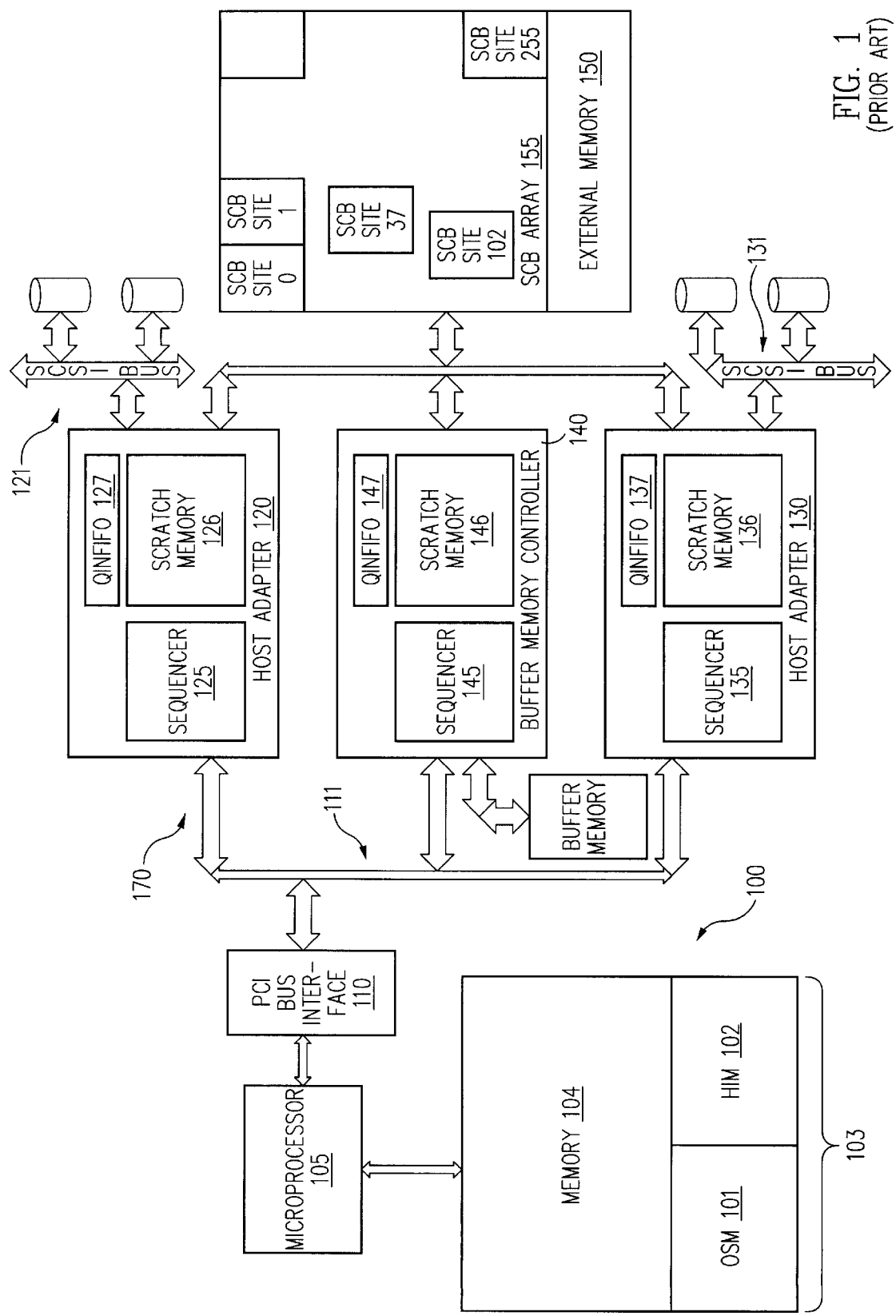
FIG. 1 is a block diagram of a prior art system that included a SCB array in an external memory.

In accordance with the principles of this invention, a method for queuing SCBs for a system 200 including a host microprocessor 105, sometimes called a system processor, and a plurality of devices 220, 230, and 240 that each includes an onboard sequencer 225, 235, and 245 respectively, that sometimes is called a device processor, is based on a single host endless new SCB queue 215 in host memory 204, that is managed such that host endless new SCB queue 215 never goes empty. As explained more completely below, host endless new SCB queue 215 is an endless queue of SCB storage sites within the memory space of device driver 203. Queue 215 is considered an array of SCB storage sites because some sites do not contain valid SCBs.

In addition to host endless new SCB queue 215, each device on I/O bus 260 also has an endless new SCB queue in common SCB array 255. These device endless new SCB queues, as explained more completely below, are managed such that the queues never are empty. Also, as explained more completely below, pointers to the head and tail SCB array storage sites of each endless new SCB queue are stored in separate memories and each pointer can be modified by only one party, i.e., one of device driver 203 and a device sequencer. This feature in combination with the endless queue simplifies queue management, and enhances performance of system 200 relative to prior art system 100.

Unlike the prior art system that used PIOs to transfer SCBs to each device, according to the principles of this invention, a single device on I/O bus 260 fetches SCBs from host memory 204 and loads the SCBs in common SCB array 255. The other devices on I/O bus 260 do not participate in the transfer of SCBs from host memory 204 to common SCB array 255. Preferably, the device on I/O bus that is the most lightly loaded in terms of task execution is selected as the device that performs the DMA transfers. In this embodiment, buffer memory controller device 240 is selected to perform the DMA transfers.

As described more completely below, sequencer 245 of device 240 maintains a host endless new SCB queue head pointer 214, sometimes referred to as host endless queue head pointer 214, that addresses the SCB in host memory 204 that is to be transferred to common SCB array 255. Sequencer 245 configures DMA engine 248 to transfer the SCB at the location addressed by head host endless new SCB queue pointer 214 from memory 204 to an intermediate SCB buffer 249.

After the SCB has been transferred by DMA engine 248 to intermediate SCB buffer 249, sequencer 245 configures DMA engine 248 to transfer the SCB from intermediate SCB buffer 249 to the appropriate SCB storage site in common SCB array 255 that is shared by devices 220, 230, and 240. Sequencer 245 is unaware of the multiplicity of endless new SCB queues in common SCB array 255, and simply places the new SCB at the storage site specified by a queue site pointer within the new SCB.

Each SCB also contains a next queue site pointer to the next SCB storage site in the endless new SCB queue containing that SCB. After the SCB being transferred from host memory 204 is loaded into the appropriate storage site in common SCB array 255, sequencer 245 sets a field in the next SCB queue site, i.e., the storage site that is addressed by a pointer in the next queue site field of the SCB, to an invalid value. As explained more completely, below, the invalid pointer value indicates to the device accessing the endless new SCB queue that there are no more executable SCBs in the endless new SCB queue at this time. However, the queue itself is not empty.

Since device sequencer 245 controls the transfer of SCBs from host memory 204 to common SCB array 255, device driver 203 for system 200 is relieved of the task of delivering SCBs to common SCB array 255. Consequently, the execution time on host microprocessor 105 associated with the prior art PIO transfers is no longer required, and so utilization of host processor 105 by system 200 is significantly reduced in comparison to prior art system 100.

Also, device sequencers 225 and 235 are never paused during the delivery of SCBs. Thus, time delays during critical operations are avoided on SCSI buses 221 and 231. In addition, any pause of sequencer 245 is much shorter than the prior art pause for a PIO transfer. Consequently, the overall performance of system 200 is improved in comparison to prior art system 100. In addition, as described more completely below, system 200 and the novel method for transferring and managing SCBs assures the functionality of chaining by eliminating any possibility of a race condition As indicated above, device driver 203, that executes on microprocessor 105, manages host adapter device 220, host adapter device 230, and buffer memory controller device 240. Specifically, in response to a command from a calling program executing on the host computer, an OSM 201 of device driver 203 transfers information for a command to HIM 202 of device driver 203. HIM 202 uses the information to build a SCB or SCBs that implement the command.

HIM 202 uses SCBs to manage host adapter devices 220, 230, and buffer memory controller device 240 that are on the host computer I/O bus, which in this embodiment is PCI bus 260. PCI bus 260 is coupled to microprocessor 105 by a PCI bus interface circuit 110. The management performed by HIM 202 includes management of host endless new SCB queue 215 for the devices on PCI bus 260.

Figure 2:
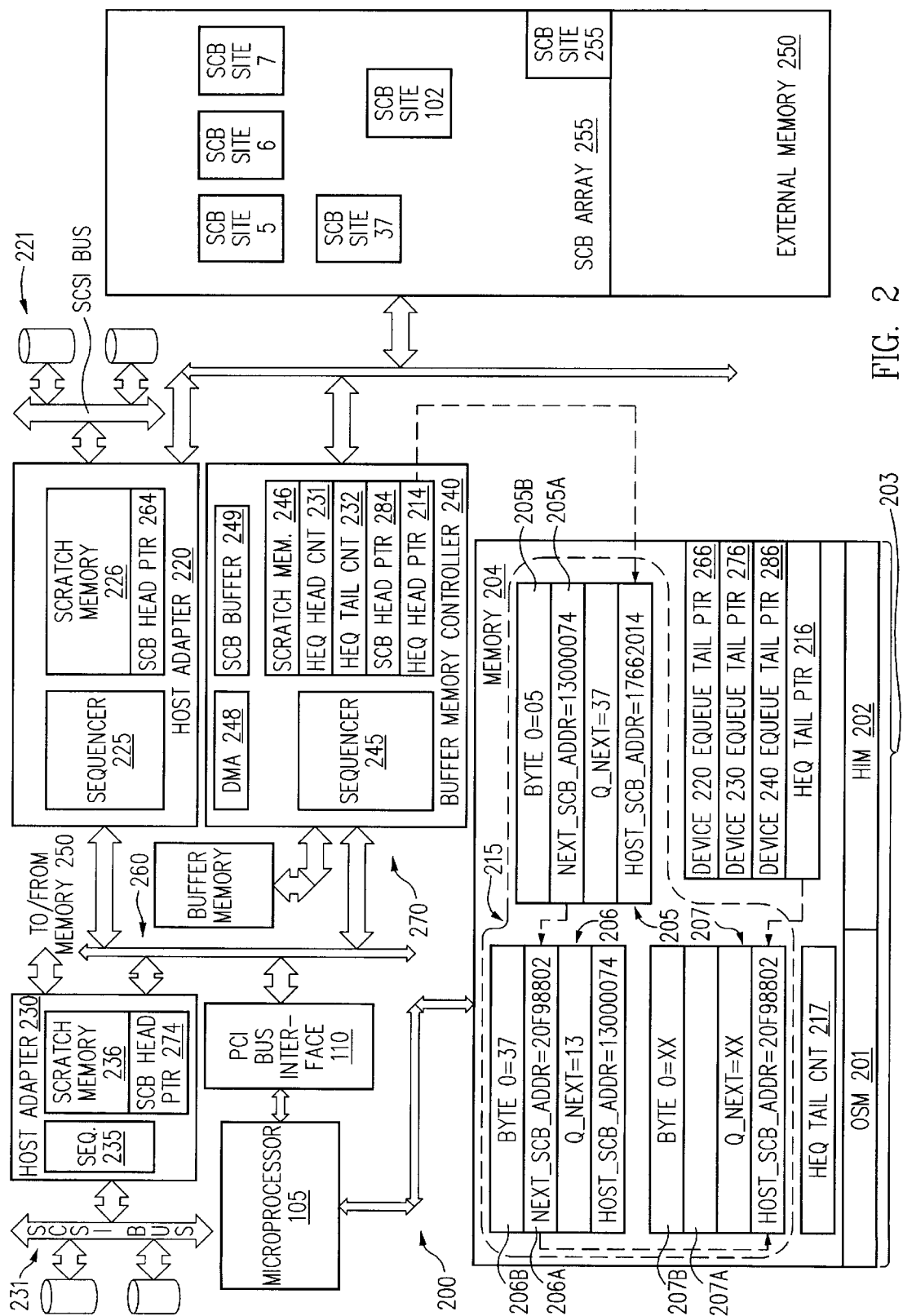
FIG. 2 is a block diagram of the system of this invention that includes a plurality of endless SCB queues within a SCB array in an external memory and an endless SCB queue in the host memory.

Unlike the prior art SCBs, the SCBs of this invention have three additional fields, a host next SCB address field, a queue site field, and a next queue site field Q_NEXT that are utilized by HIM 202, as explained more completely below, for delivery of new SCBs. The other aspects of the SCBs are similar to those of the prior art. In FIG. 2, only the fields of the SCB related to this invention are illustrated so as to avoid detracting from the invention. This should not be interpreted as indicating that a SCB contains only the fields illustrated.

The host next SCB address fields are used to couple SCB sites 205 to 207 in host memory 204 in a linked list. Host next SCB address field 205A of SCB site 205 addresses SCB site 206, and host next SCB address field 206A of SCB site 206 addresses SCB site 207. Since SCB site 207 is at the end of the linked list, the address in host next SCB address field 207A is undefined.

The destination of a SCB in common SCB array 255 is specified in the queue site field. In SCB 205, queue site field 205B points to SCB site five in common SCB array 255, queue site field 206B points to SCB site thirty-seven, and the SCB site pointer in queue site field 207B is undefined because SCB site 207 is empty. Thus, in this embodiment, the queue site field specifies the destination for the SCB within common SCB array 255 in external memory 250 in a DMA transfer, whereas host next SCB address field specifies the source address for the next SCB to be DMAed from host memory 204.

In host memory 204, next queue site field Q_NEXT contains either a SCB site pointer with a pointer value that points to the next SCB site in a device endless new SCB queue within common SCB array 255, or an undefined SCB site pointer. In SCB 205, next queue site field Q_NEXT contains a value of thirty-seven for the SCB site pointer, which means that the next SCB following SCB 205 in SCB site five in the device endless new SCB queue for the device will be at SCB site thirty-seven in common SCB array 255. In SCB 206, next queue site field Q_NEXT contains a value of thirteen, which means that the next SCB in the endless new SCB queue following SCB 206 in site thirty-seven will be at SCB site thirteen in common SCB array 255. In SCB 207, the pointer in next queue site field Q_NEXT is undefined because HIM 202 has not allocated any additional storage sites in common SCB array 255 for the device endless new SCB queue of the device.

Host endless new SCB queue 215 has head and tail pointer delimiters. Host endless queue head pointer 214 is accessible only by sequencer 245 in scratch memory 246 following initialization, and host endless new SCB queue tail pointer 216 is accessible only by device driver 203 in host memory 204. The use and management of head and tail pointers 214 and 216 is described more completely below.

HIM 202 appends a new SCB to host endless new SCB queue 215, using host endless new SCB queue tail pointer 216 to identify the next SCB storage site in host memory 204. The new SCB is written to the storage site addressed in host memory 204 by host endless new SCB queue tail pointer 216. HIM 202 allocates another SCB storage site in host memory 204 for another SCB, that will be appended to host endless new SCB queue 215 in the future. HIM 202 loads the address for the another SCB storage site into host next SCB address field of the new SCB being appended to host endless new SCB queue 215, and into host endless new SCB queue tail pointer 216.

For each SCB appended to host endless new SCB queue 215, HIM 202 increments a running count of the queued SCBs since initialization, and loads that count into host endless queue tail count register 232 on device 240. HIM 202 maintains a copy of this count in host endless queue tail count register 217 in host memory 204. Hence, HIM 202 can increment the count without reading the count stored on device 240. The count rolls over to zero when it is incremented to the number of sites in common SCB array 255.

Sequencer 245 determines that there is at least one new SCB in host endless new SCB queue 215 when the count in host endless queue tail count register 232 is not equal to a count in host endless queue head count register 231. Each time sequencer 245 removes a new SCB from host endless new SCB queue 215, sequencer 245 increments the count in host endless head count register 231. Thus, when the counts are not equal, one or more new SCBs are available for transfer in host endless new SCB queue 215.

When the counts are unequal, sequencer 245 uses host endless queue head pointer 214 in memory 246 to identify the SCB at the head of queue 215. SCBs are removed from queue 215 in order only by sequencer 245; a SCB is never skipped. This assures, for example, that a head of chain SCB that is placed in queue 215 after all others SCBs in the chain cannot be transferred to a device and execution started before all of the other SCBs in the chain are transferred to device endless new SCB queues in common SCB array 255.

Sequencer 245 configures DMA engine 248 to transfer the head SCB, as identified by host endless queue head pointer 214, from host memory 204 to an intermediate SCB buffer 249. As explained above, the SCB contains the destination site in common SCB array 255 in the queue site field. Hence, upon completion of the DMA transfer, sequencer 245 reads the device SCB array site from intermediate SCB buffer 249. Sequencer 245 configures DMA engine 248 to transfer the SCB from intermediate SCB buffer 249 to the specified device SCB array site in common SCB array 255.

Following the DMA transfer to common SCB array 255, sequencer 245 reads a next queue site pointer in the transferred SCB. Sequencer 245 writes an invalid queue site pointer in the SCB site in common SCB array 255 addressed by the read next queue site pointer. As explained more completely below, this operation defines a new tail site for the endless new SCB queue in which sequencer 245 placed the new SCB.

Following the DMA transfer to common SCB array 255, sequencer 245 also updates host endless queue head pointer 214 by copying the address in host next SCB address field to host endless queue head pointer 214 in preparation for the DMA transfer of another SCB.

Management of Host Endless New SCB Queue

Figure 3A:
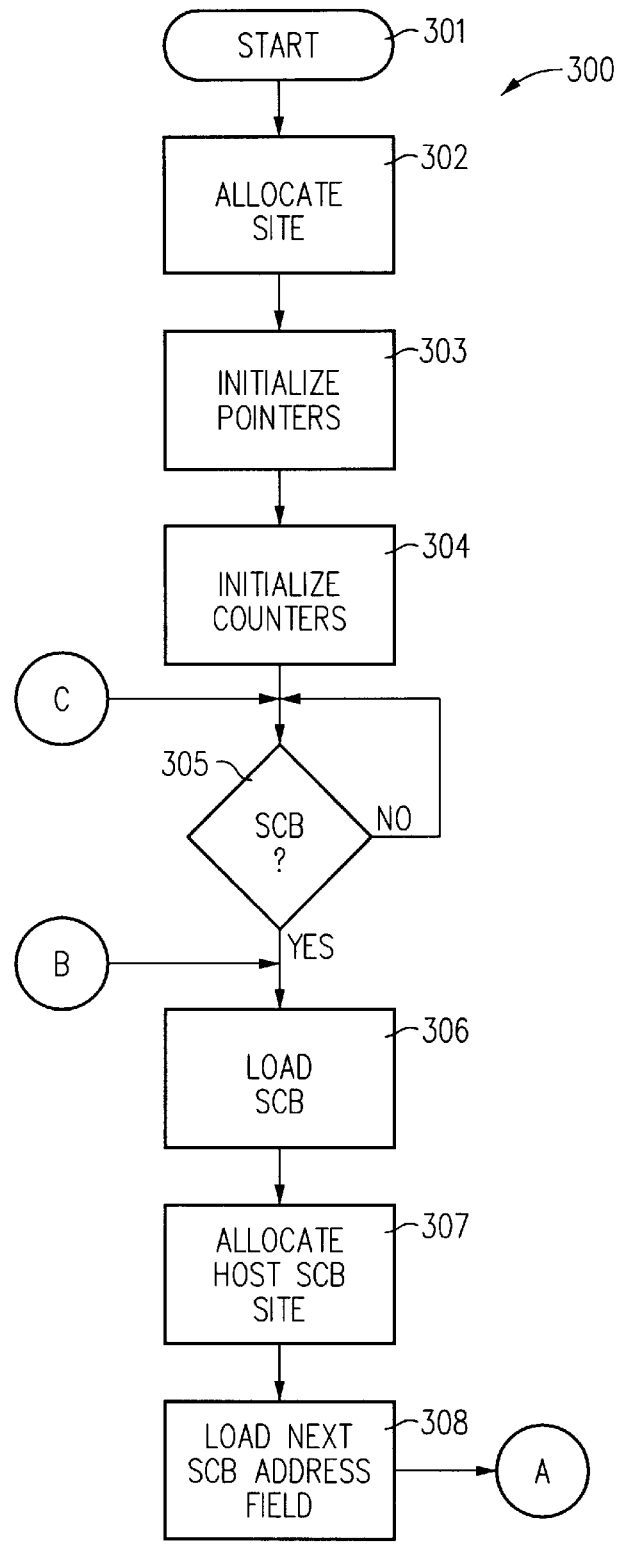
FIGS. 3A to 3C are a process flow diagram for management of the host endless SCB queue.
Figures 3B, 3C:
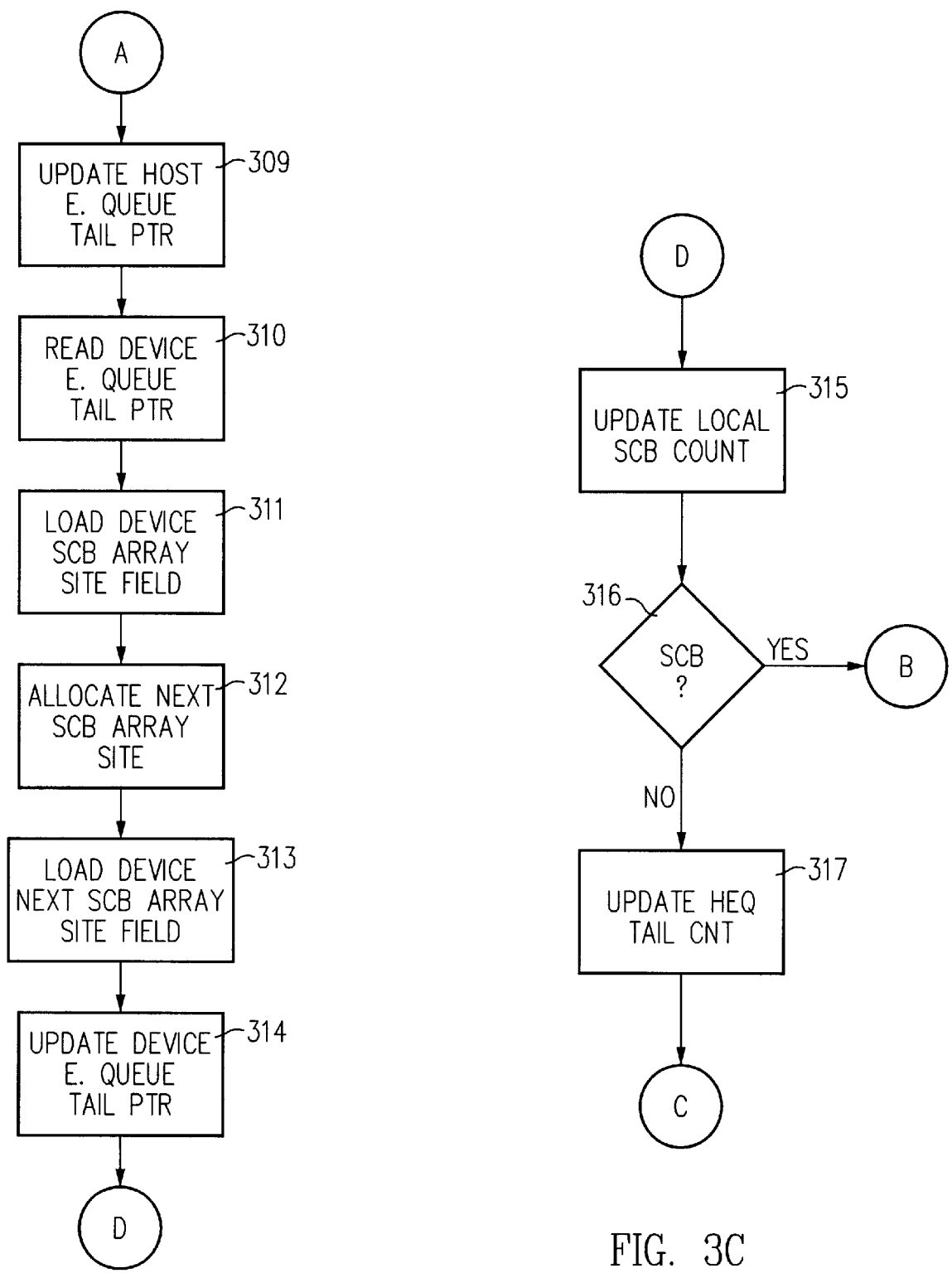

FIGS. 3A to 3C are a process flow diagram for management of host endless new SCB queue 215 by HIM 202. Upon start 301 of endless new SCB queue management process 300, HIM 202 allocates a new SCB site in host memory 204 to endless new SCB queue 215 in allocate site operation 302, even though HIM 202 has not yet built a SCB for execution. In this example, allocated SCB site 205 is located at PCI hex address 17662014 (FIG. 4A) (In FIG. 4A, the various pointers, registers and blocks are shown for ease of illustration only. The location of the various components is illustrated in FIG. 2). Upon allocation of the SCB site, processing transfers from operation 302 to initialize pointers operation 303.

Figure 4A:
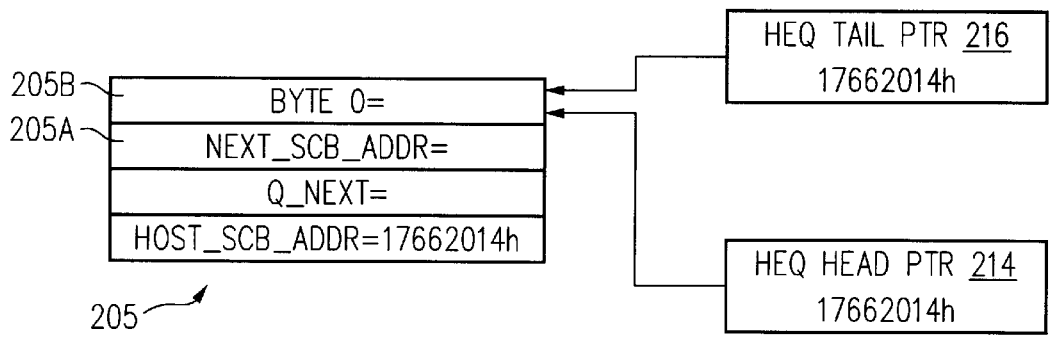

In initialize pointers operation 303 HIM 202 loads host endless new SCB queue tail pointer 216 in memory 204 (FIG. 2) with the address of the allocated SCB site and also initializes host endless new SCB queue head pointer 214 in memory 246 to this address (FIG. 4A). This is the only time HIM 202 accesses host endless queue head pointer 214.

In operation 303, HIM 202 next allocates a different SCB storage site in common SCB array 255 for each of devices 220, 230, and 240, e.g., sites five, six, and seven, respectively, even though HIM 202 has not yet built a SCB for execution. HIM 202 loads field Q_NEXT in each allocated SCB array site with an invalid SCB site pointer, e.g., 255, to indicate that this storage site is the tail site of the endless new SCB queue for the device, and that the storage site is empty.

HIM 202 maintains an endless new SCB queue tail pointer 266 for an endless new SCB queue 265 for device 220, an endless new SCB queue tail pointer 276 for an endless new SCB queue 275 for device 230, and an endless new SCB queue tail pointer 286 for an endless new SCB queue 285 for device 240. In operation 303, HIM 202 loads the address of the storage site in common SCB array 255 for each device into the endless new SCB queue tail pointer for that device.

In operation 303, HIM 202 also initializes head new SCB site pointer 264 in scratch memory 226 to the address of the head new SCB storage site for device 220; head new SCB site pointer 274 in scratch memory 236 to address of the head new SCB storage site for device 230; and head new SCB site pointer 284 in scratch memory 246 to address of the head new SCB storage site for device 240. This is the only time that HIM 202 accesses head new SCB site pointers 264, 274, and 284. Consequently, after initialize pointers operation 303, only sequencer 225, 235, and 245 can modify head new SCB site pointers 264, 274, and 284, respectively. Upon completion of operation 303, processing transfers to initialize counters operation 304.

In initialize counters operation 304, HIM 202 initializes host endless queue tail count register 232 and host endless queue head count register 231 to a predefined value, which in this embodiment is zero (FIG. 4A). Operations 302 to 304 complete the initialization of endless new SCB queue management process 300. Consequently, process 300 is suspended until HIM 202 receives information for building at least one SCB. This is represented by SCB check operation 305. Those of skill in the art will appreciate that it is unnecessary for HIM 202 to remain in check operation 305 until a SCB is built. HIM 202 can perform other operations and when a SCB is built branch to operation 306. Operation 305 is used only to indicate that no further actions are taken in process 300 until a new SCB is built.

After completion of initialization, sequencer 245 may look for new SCBs to transfer to common SCB array 255. As explained above, sequencer 245 compares counters 231 and 232. Upon determining that counters 231 and 232 have the same value, sequencer 245 concludes that there are no new SCBs waiting for transfer in queue 215. Note that at this time, the pointers in fields 205A, 205B, and Q_NEXT in site 205 (FIG. 4A) are undefined.

Eventually, HIM 202 receives via OSM 201 a request from a caller program to generate SCBs, and in this example, HIM 202 generates two SCBs. HIM 202 knows the device or devices that are to execute the SCBs. In this example it is assumed that the SCBs are for the same device, e.g., device 220, although this is not a requirement.

Since HIM 202 has two new SCBs, HIM 202 leaves check operation 305 and initiates load SCB operation 306. In operation 306, HIM 202 loads a first SCB into SCB site 205 that is identified by host endless new SCB queue tail pointer 216, that is the SCB storage site at address 17662014h in host memory 204.

After loading the SCB, HIM 202 allocates another SCB storage site 206 (FIG. 4B) in host memory 204 in allocate host SCB site operation 307. In this example, the SCB storage site is at PCI address 13000074h.

Following completion of operation 307, HIM 202 links SCB site 206 to the SCB loaded in site 205 in load host next SCB address field operation 308. In operation 308, HIM 202 loads the address of SCB site 206 into next SCB site field 205A of the SCB loaded in SCB site 205. Operation 308 transfers processing to update host endless queue tail pointer operation 309.

In update host endless tail pointer operation 309, HIM 202 writes the address of SCB site 206, i.e., the address of the new tail SCB of queue 215, into host endless new SCB queue tail pointer 216 (FIG. 4B), and transfers processing to read device endless new SCB queue tail pointer operation 310.

Recall, as indicated above, HIM 202 knows which device will execute the first SCB. In this example, the device is assumed to be host adapter device 220. Thus, in operation 310, HIM 202 reads site five from endless new SCB queue tail pointer 266 in memory 204 (FIG. 2), and transfers to load device SCB array site field operation 311 that in turns loads SCB array site five in queue site field 205B (FIG. 4B). Site five is the tail site of endless new SCB queue 265 for device 220 in common SCB array 255. Operation 311 transfers to allocate next queue site operation 312

In allocate next queue site operation 312, HIM 202 allocates a new tail site in common SCB array 255 for endless new SCB queue 265 for device 220. In this example, HIM 202 allocates SCB storage site thirty-seven, and transfers processing to load next queue site field operation 313, which in turn loads thirty-seven into next queue site field Q_NEXT of SCB 205 (FIG. 4B).

Operation 313 transfers processing to update device tail pointer operation 314. In operation 314, HIM 202 loads the newly allocated SCB storage site into device 220 tail pointer 266 and transfers processing to update local SCB count operation 315 (FIG. 3C).

In update local SCB count operation 315, HIM 202 reads a local host endless queue tail count register 217, that was initialized to zero, adds one to the value, and stores the new value back in local host endless queue tail count register 217.

Operation 315 transfers to additional SCB check operation 316. Since, in this example, two SCBs are being generated, check operation 316 transfers processing to load SCB operation 306 (FIG. 3A). If only a single SCB were being transferred, check operation 316 would transfer to update host endless queue tail count operation 317.

Upon returning to operation 306, HIM 202 loads the second SCB into SCB site 206 that is identified by host endless new SCB queue tail pointer 216, that is the site at address 13000074h, in host memory 204.

After loading the second SCB, HIM 202 allocates another SCB site 207 (FIG. 4C) in host memory 204 in allocate host SCB site operation 307. In this example, the next SCB site is at PCI address 20F98802h.

Following completion of operation 307, HIM 202 links SCB site 207 to the second SCB loaded in site 206 in load next host SCB address field operation 308. In operation 308, HIM 202 loads the PCI address of SCB site 207 into next host memory SCB site field 206A (FIG. 4C) of the SCB loaded in site 206. Operation 308 transfers processing to update host endless queue tail pointer operation 309.

In update host endless queue tail pointer operation 309, HIM 202 writes the address of SCB site 207 in host memory 204, i.e., the address of the new tail SCB of queue 215, into host endless new SCB queue tail pointer 216, and transfers processing to read device endless new SCB queue tail pointer operation 310.

Figure 4C:
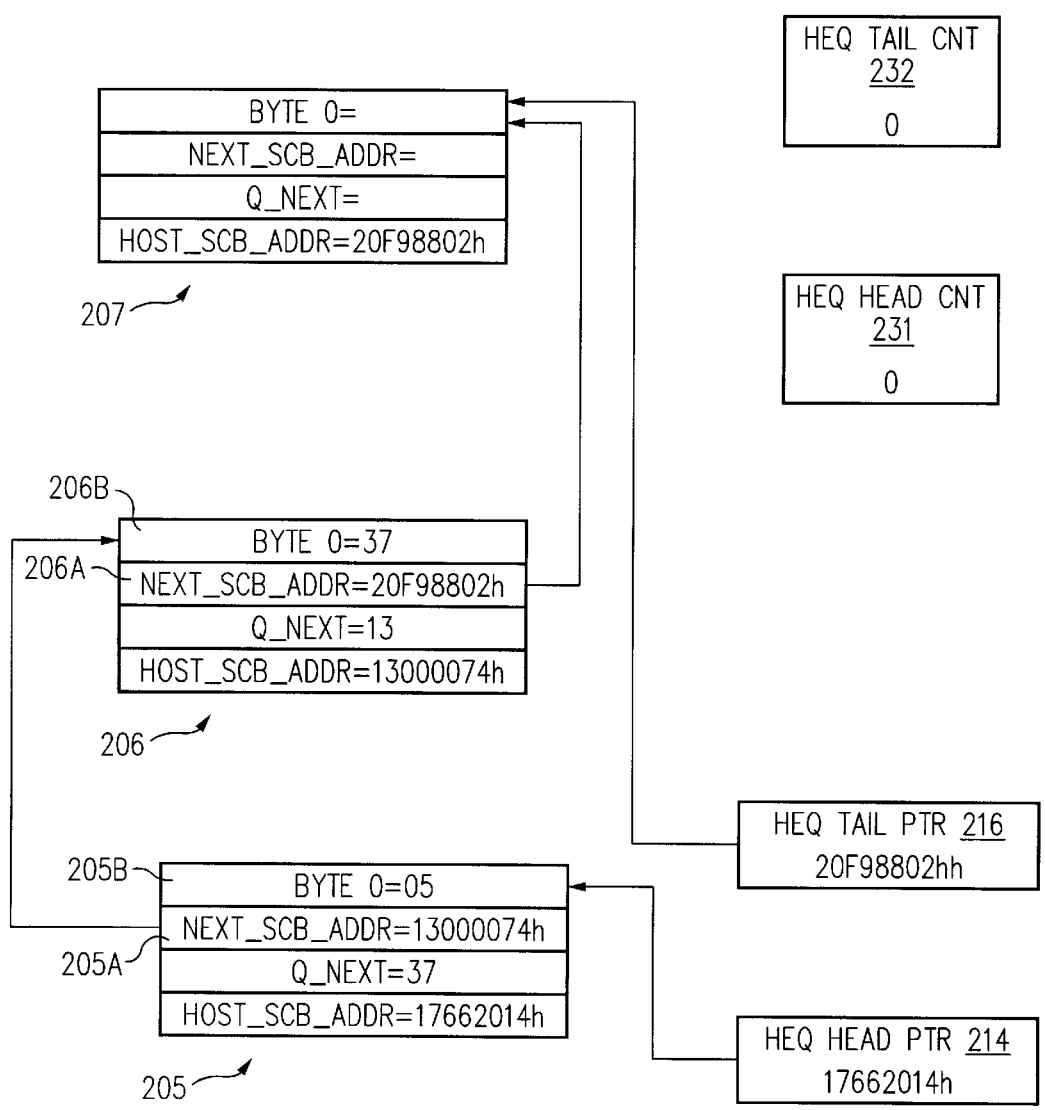

Recall, as indicated above, HIM 202 knows which device will execute the second SCB also. In this example, the device again is assumed to be host adapter device 220. Thus, in operation 310, HIM 202 reads site thirty-seven from device 220 tail pointer 266 in memory 204, and transfers to load device SCB array site field operation 311 that in turns loads SCB array site thirty-seven in queue site field 206B (FIG. 4C). If the SCB were for other than device 220, HIM 202 would read the tail pointer of the endless new SCB queue of that device in common SCB array 255 and load that site address into queue site field 206B. Site thirty-seven is the tail site of endless new SCB queue 265 for device 220 in common SCB array 255. Operation 311 transfers to allocate next queue site operation 312

In allocate next queue site operation 312, HIM 202 allocates a new tail site in common SCB array 255 for endless new SCB queue 265 for device 220. In this example, HIM 202 allocates SCB storage site thirteen, and transfers processing to load next queue site field operation 313, which in turn loads thirteen into next queue site field Q_NEXT of SCB 206 (FIG. 4C).

Operation 313 transfers processing to update device endless queue tail pointer operation 314. In operation 314, HIM 202 loads the newly allocated SCB storage site into endless new SCB queue tail pointer 266 and transfers processing to update local SCB count operation 315 (FIG. 3C).

In update local SCB count operation 315, HIM 202 reads local host endless queue tail count register 217, adds one to the value, and stores the new value back in local host endless queue tail count register 217.

Operation 315 transfers to additional SCB check operation 316. Since, in this example, the two new SCBs have been added to host endless new SCB queue 215, check operation 316 transfers processing to update host endless queue tail count operation 317.

Figure 4D:
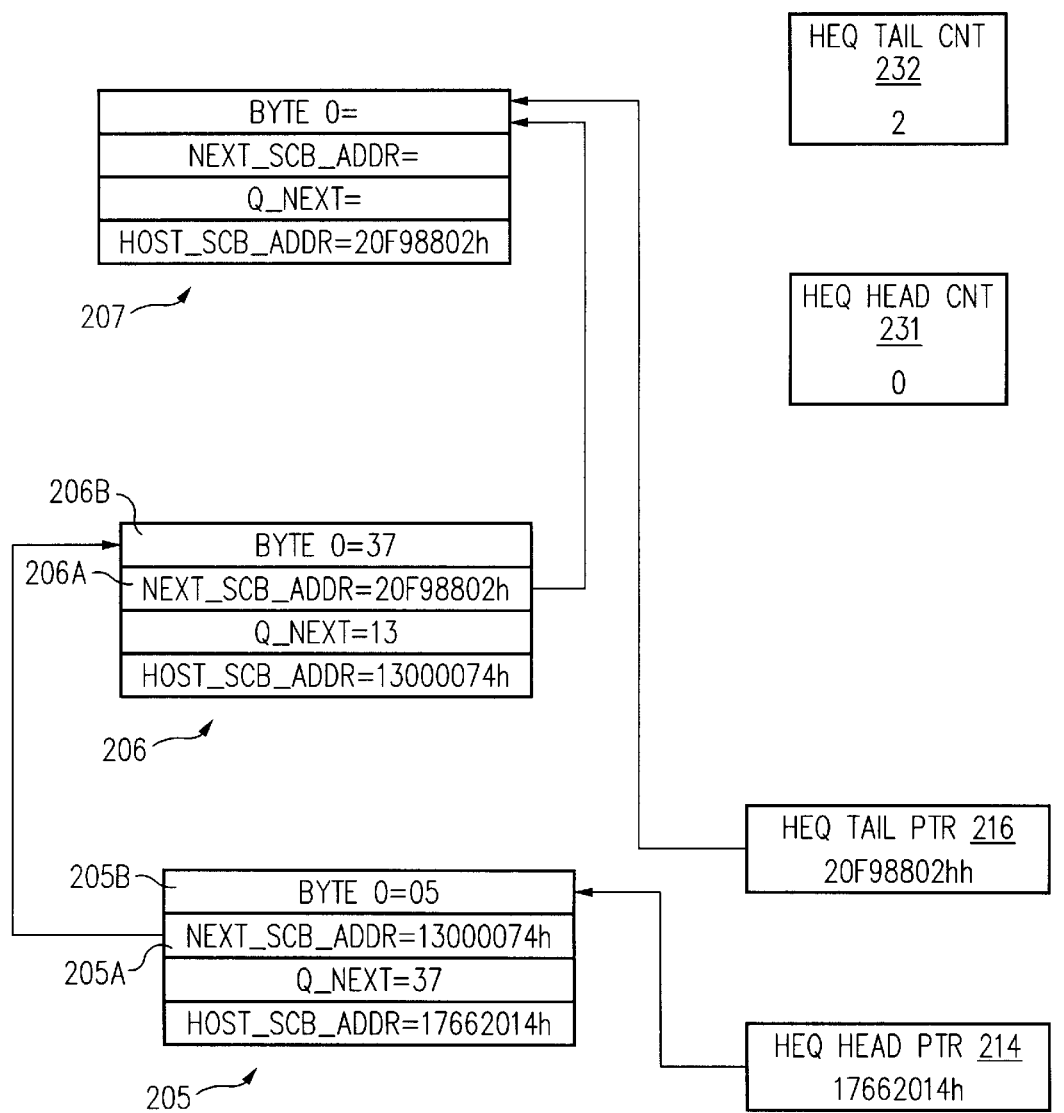

In update host endless tail count operation 317, HIM 202 reads local host endless queue tail count register 217, and copies the value in register 217 to host endless queue tail count register 232. Thus, as shown in FIG. 4D, the values of host endless queue tail count register 232 and host endless queue head count register 231 are no longer equal.

Until HIM 202 updates host endless queue tail count register 232, sequencer 245 is unaware of the two new SCBs appended to host endless new SCP queue 215. HIM 202 has defined the two new SCBs and the new value of host endless new SCB queue tail pointer 216 through a sequence of operations of its choice, and without in anyway affecting the operation of sequencer 245. Only when the update of host endless new SCB queue 215 is complete does HIM 202 advise sequencer 245 of the new SCBs appended to queue 215 by updating host endless queue tail count register 232. At the instant of writing register 232, sequencer 245 is able to recognize that two new SCBs are in queue 215.

When HIM 202 is building a chain of SCBs, HIM 202 places the head of chain SCB in host endless new SCB queue 215 last. As explained more completely below, this assures that the head of chain SCB is not placed in a device endless new SCB queue until all other SCBs in the chain are already in one of the device endless new SCB queues. Therefore, the processes of this invention eliminate any possibility of a race condition in executing a chain of SCBs.

Management of SCB Transfers From Host Memory

Figure 5:
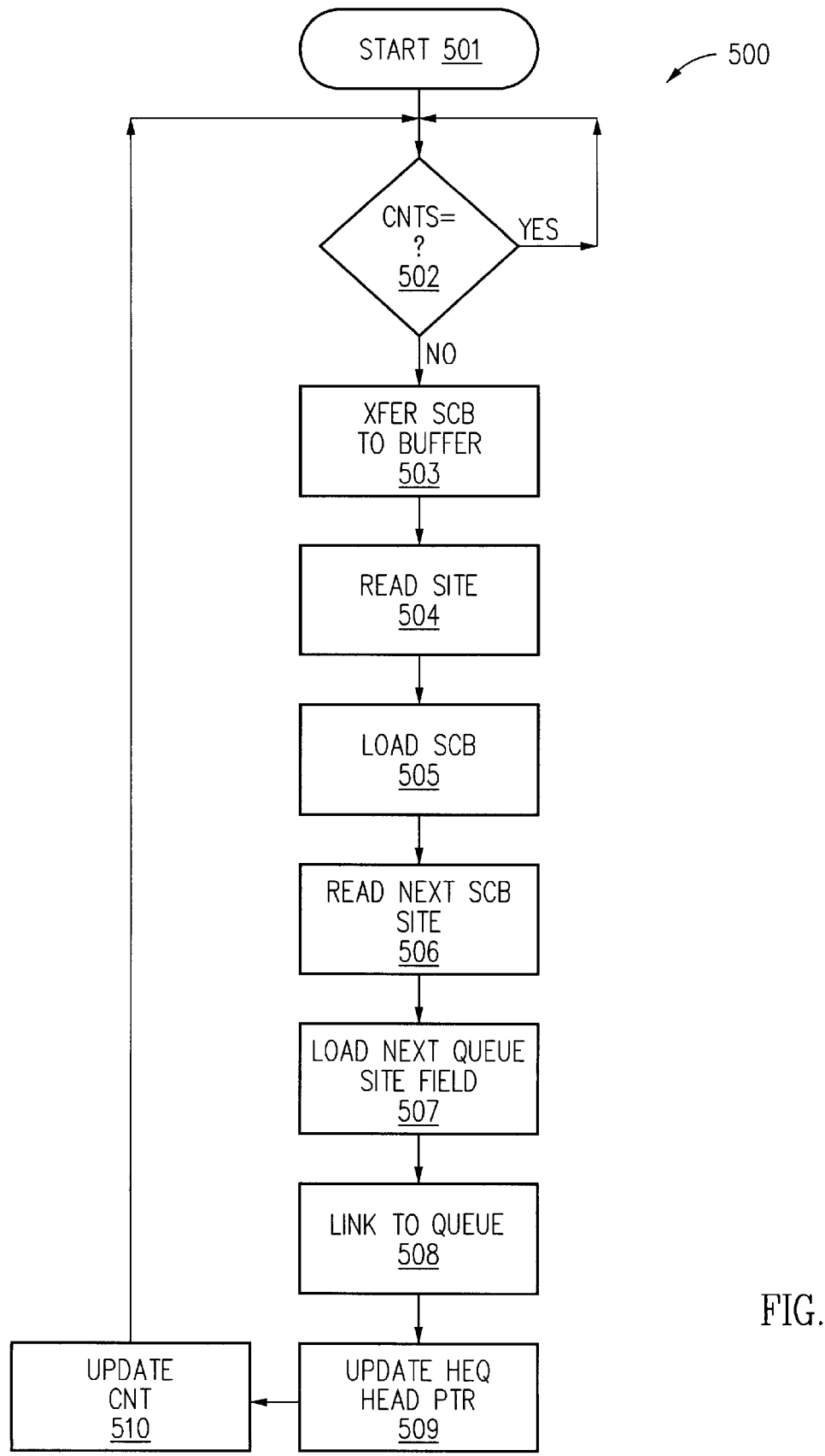
FIG. 5 is a process flow diagram of one embodiment of a device SCB transfer process according to the principles of this invention.

At this time, the configuration of common SCB array 255 is illustrated in FIG. 6A based upon the above description. (In FIG. 6A, the various pointers, registers and blocks are shown for ease of illustration only. The location of the various components is illustrated in FIG. 2.) Sequencer 245, in start operation 501 (FIG. 5) starts SCB transfer process 500 and in check counts operation 502, sequencer 245 recognizes that the value in host endless queue tail count register 232 is not equal to the value in host endless head count register 231 and so processing transfers to transfer SCB to buffer operation 503.

In transfer SCB to buffer operation 503, sequencer 245 configures DMA engine 248 to transfer a new SCB from host endless new SCB queue 215 in host memory 204 to intermediate SCB buffer 249. Specifically, sequencer 245 reads the source starting address for the DMA transfer from host endless queue head pointer 214 in memory 246, which is address 17662014h (FIG. 4D). The destination address for the DMA transfer is the address of intermediate SCB buffer 249. When DMA engine 248 completes the transfer, SCB 205 is in intermediate SCB buffer 249, and processing by sequencer 245 transfers to read queue site operation 504.

In read queue site operation 504, sequencer 245 reads queue site field 205B from the SCB in intermediate SCB buffer 249 to determine the destination site for the SCB in common SCB array 255, which in this example is SCB site five. Upon completing operation 504, sequencer 245 initiates load SCB operation 505.

In load SCB operation 505, sequencer 245 configures DMA engine 248 to execute a DMA transfer from intermediate SCB buffer 249 to the destination site in common SCB array 255 and DMA engine 248 subsequently performs the transfer. Notice that this transfer is within device 240 and so does not place any load on bus 260. Also, sequencer 245 places the SCB into the appropriate location in a device endless new SCB queue without any knowledge of the device endless new SCB queues in memory 250.

In the DMA transfer, byte zero of the SCB is not transferred to the storage site in common SCB array 255, and the invalid SCB site pointer in field Q_NEXT of the common SCB array site, e.g, SCB array site five, is unchanged. If sequencer 225 scans endless new SCB queue 265 after SCB array site five is loaded, sequencer 225 still does not recognize an executable SCB at SCB array site five due to the invalid pointer value in field Q_NEXT. Upon completion of load SCB operation 505, processing transfers to read next SCB site 506.

In read next SCB site operation 506, sequencer 245 reads field Q_NEXT in the SCB stored in intermediate SCB buffer 249. In this example, field Q_NEXT contains thirty-seven. (See FIG. 4D.) Operation 506 transfers processing to load next queue site field operation 507.

In load next queue site field operation 507, sequencer 245 loads an invalid pointer into field Q_NEXT of the queue site read from field Q_NEXT in intermediate SCB buffer 249, e.g., SCB array site thirty-seven in this example. Operation 507 transfers processing to link to queue operation 508.

When operation 507 is finished, delivery of the first SCB from HIM 202 to sequencer 225 is complete, and the SCB is placed in endless SCB queue 265 for device 220. Specifically, in link to queue operation 508, sequencer 245 appends SCB site thirty-seven to endless new SCB queue 265 by loading field Q_NEXT in SCB site five with a SCB site pointer of thirty-seven. Thus, operation 508 links the new SCB to queue 265. At this instant in time, the new SCB can be recognized by sequencer 225 as a candidate for execution. In this embodiment, link to queue operation 508 transfers processing to update host endless queue head pointer operation 509.

After completion of operation 508, sequencer 245 enters update host endless queue head pointer operation 509. Specifically, sequencer 245 copies the address in host next SCB address field 205A to host endless queue head pointer 214 in scratch memory 246. Thus, host endless queue head pointer 214 identifies PCI address 13000074h in host memory 204 as the site of the next SCB in host endless new SCB queue 215. Operation 509 transfers processing to update count operation 510.

Figure 6B:
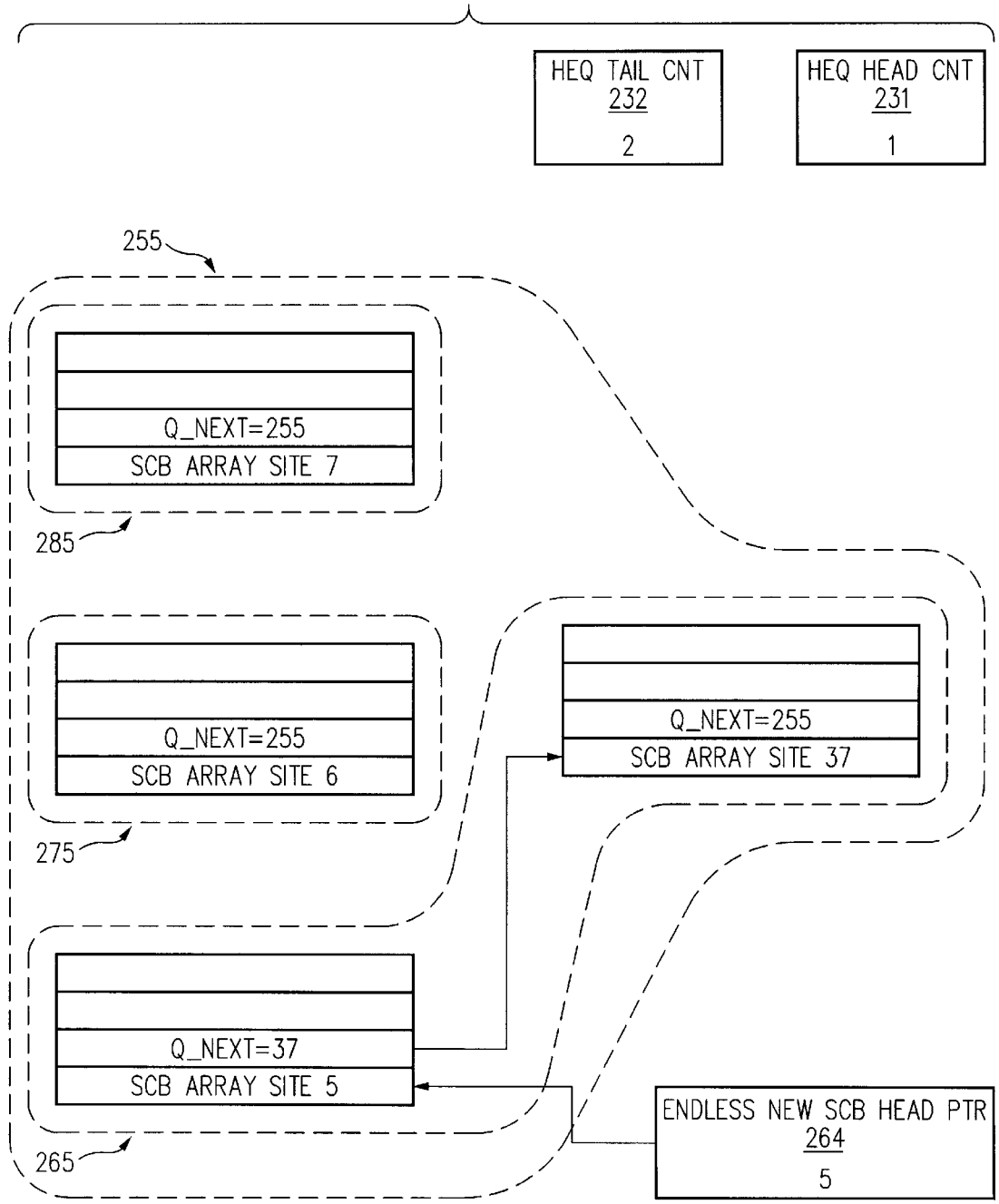

In operation 510, sequencer 245 increments the count in host endless queue head count register 231 so that the value of register 231 is one (FIG. 6B). Operation 510 returns processing to count check operation 502.

Figure 6C:
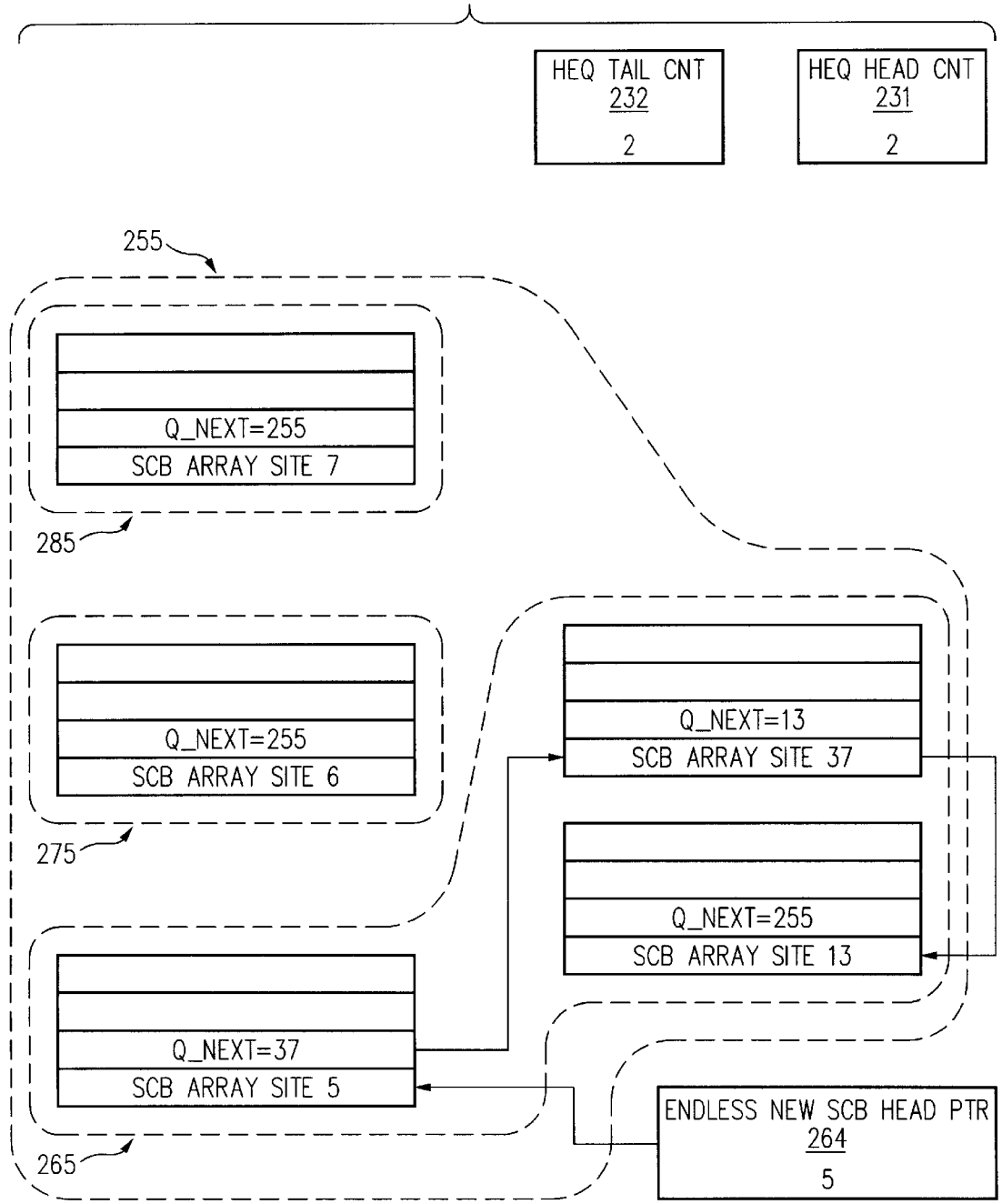
Figure 7:
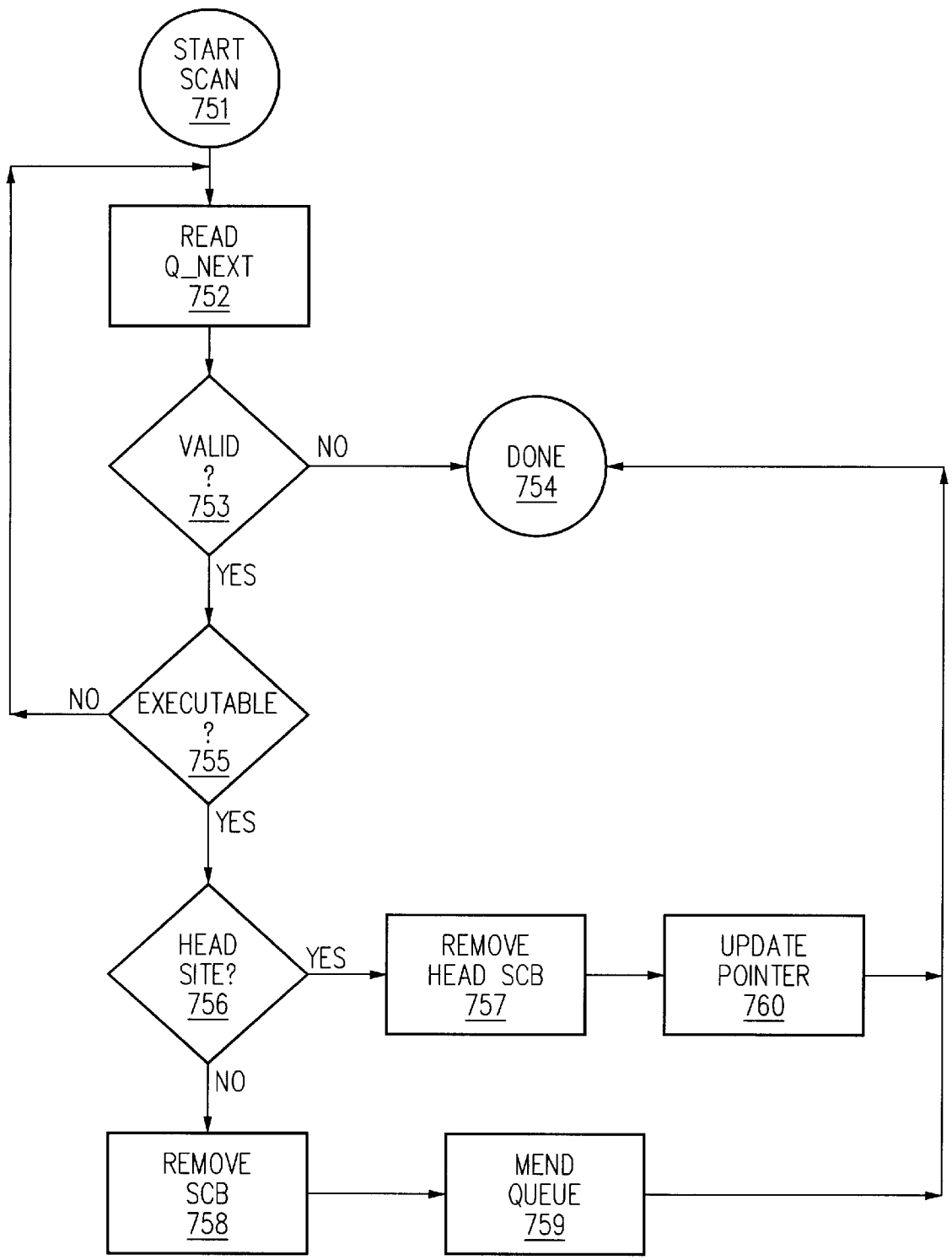
FIG. 7 is a process flow diagram of one embodiment of the process of this invention for removing SCBs from an endless new SCB queue.

Since counters 231 and 232 are still not equal, operations 503 to 510 are repeated for SCB 206, and common SCB array 255 is configured as shown in FIG. 6C. Upon completion of operation 510, host endless queue head pointer 214 contains PCI address 20F98802h and the values of counters 231 and 232 are equal. Thus, host endless new SCB queue 215 still exists, and is ready for addition of other new SCBs. The sequence of operations in transfer SCB operation 500 is illustrative only and is not intended to limit the invention to the particular sequence described.

Device Endless New SCB Queue Management

As explained above, each device 220, 230, and 240 has its own device endless new SCB queue 265, 275, and 285, respectively, within common SCB array 255 (FIG. 6A). HIM 202 adds SCBs to device endless new SCB queues 265, 275, and 285 as described above. Sequencers 225, 235, and 245 remove SCBs from device endless new SCB queues 265, 275, and 285, respectively. Specifically, each sequencer only removes new SCBs from its own device endless new SCB queue.

Each device endless new SCB queue of this invention has head and tail pointers, but these pointers are not commonly accessible by both HIM 202 in device driver 203 and host adapter sequencers 225, 235, and 245. The head pointer is accessible by only the sequencer, and the tail pointer is accessible by only HIM 202.

Thus, HIM 202 reads and modifies only device endless new SCB queue tail pointers 266, 276, and 286 for device endless new SCB queues 265, 275, and 285, respectively, as described above. Thus, in this embodiment, tail pointers 266, 276, and 286 for device endless new SCB queues 265, 275 and 285, respectively, are located in microprocessor memory, e.g., memory 204 that is addressable only by microprocessor 105. Each sequencer reads and modifies only the device endless new SCB queue head pointer for its device endless new SCB queue. Therefore, one party, either HIM 202 or one of sequencers 225, 235, 245 cannot be reading a queue delimiter while the other party is modifying that delimiter.

Device endless new SCB queue 265 holds SCBs for execution by host adapter device 220. Thus, head new SCB site pointer 264 to the head new SCB storage site in device endless new SCB queue 265 is stored in scratch memory 226 of sequencer 225.

Device endless new SCB queue 275 holds SCBs for execution by host adapter device 230. Head new SCB site pointer 274 to the head new SCB storage site in device endless new SCB queue 275 is stored in scratch memory 236 of sequencer 235.

Device endless new SCB queue 285 holds SCBs for execution by host adapter device 240. Head new SCB site pointer 284 to the head new SCB storage site in device endless new SCB queue 285 is stored in scratch memory 246 of sequencer 245.

In an initialization process, such as that described above, HIM 202 must have access to all of the head new SCB queue pointers including those for device endless new SCB queues 265, 275, 285 that are stored in scratch memories of the sequencers. After initialization, HIM 202 does not access the head new SCB queue pointers for device endless new SCB queues 265, 275, 285.

During normal operation, i.e., operation after initialization is completed, the only commonly accessible queue pointer, i.e., accessible by both HIM 202 via sequencer 245 and the plurality of sequencers 225, 235, and 245 is the SCB site pointer that forms a link between SCBs in a device endless SCB queue. By reducing the number of commonly accessible pointers to one, intermediate states of a queue have been eliminated along with any need for a token locking scheme. With the device endless queues of this invention, a SCB can be appended to the device endless queue at any time independent of the removal of a SCB from the device endless queue. Following initialization, a device endless SCB queue is never empty. There is always at least one SCB storage site allocated to each device endless SCB queue.

Each new SCB endless queue in common SCB array 255 is a queue of SCB array sites. As explained more completely below, each device endless queue is a linked list of SCB array sites and there is no requirement that the SCB array sites be contiguous locations within memory 250.

Generally, all SCB array sites in a device endless new SCB queue contain SCBs, except the tail site. The SCB array sites in a device endless new SCB queue that contain a SCB are linked by the SCB site pointers stored in next queue site fields Q_NEXT of the SCBs. Although the tail site does not contain a SCB, the storage location within the tail site, that corresponds to the location of next queue site field Q_NEXT in a SCB, contains an invalid SCB site pointer value, which in this embodiment is 255, to identify that site as the tail of the device endless new SCB queue. The invalid pointer in next queue site field Q_NEXT of the tail site can be written only by the appending party, i.e, sequencer 245. Thus, the one common register, e.g., storage location in a SCB array site within a device endless new SCB queue, is accessible by two parties, but is writable by only one of the parties. This eliminates any timing windows with respect to reading and writing in a device endless SCB queue.

In the following example, management of device endless new SCB queue 265 by sequencer 225 is described. The management of the other device endless new SCB queues in common SCB array 255 is equivalent to the following description and so will be apparent to those of skill of the art in view of the description. Sequencer 225 maintains head new SCB site pointer 264 that is inaccessible to HIM 202 after initialization. Head new SCB site pointer 264 always identifies the beginning of device endless new SCB queue 265.

Figure 8A:
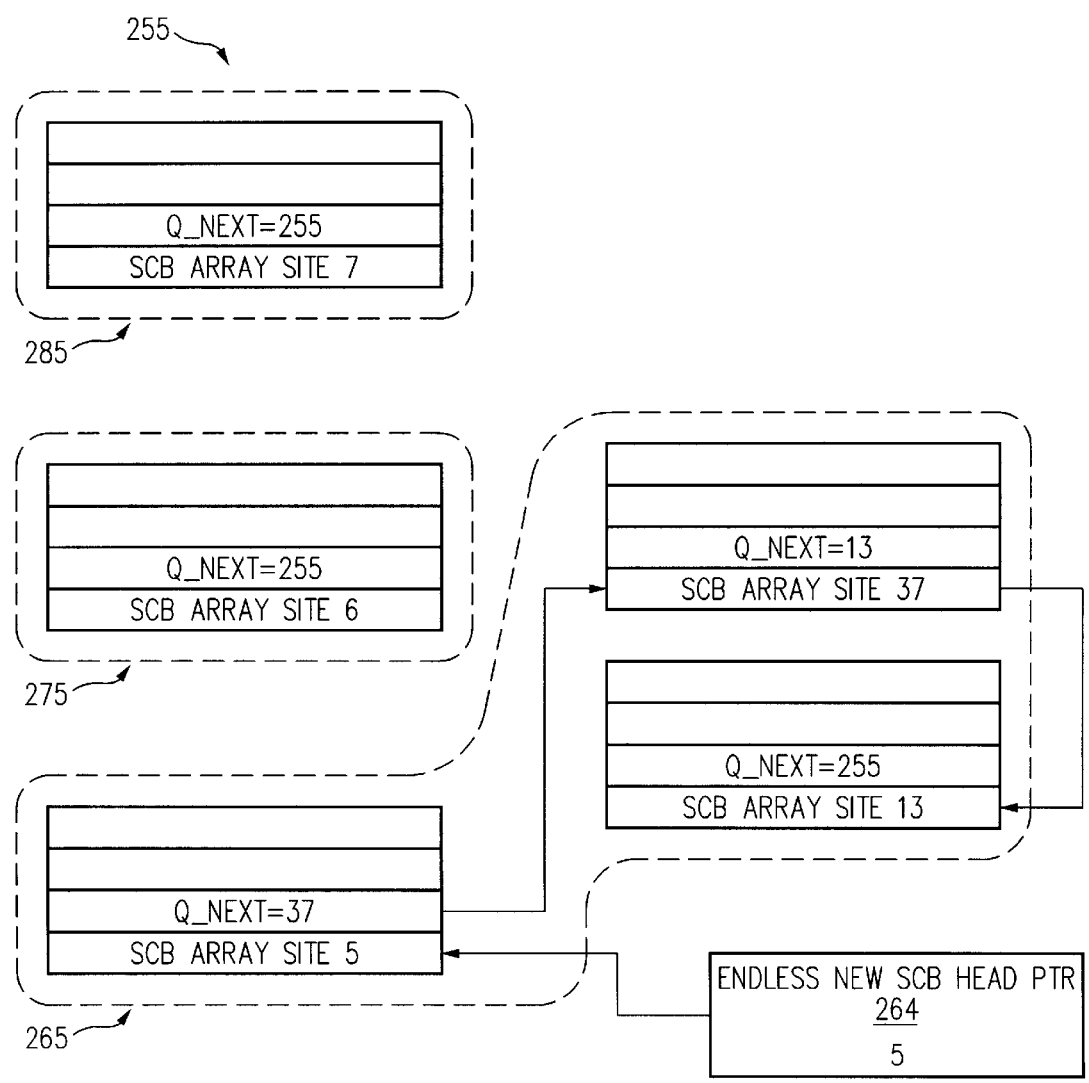
FIGS. 8A to 8C illustrate selected states of an endless new SCB queue when SCBs are removed from that queue according to the principles of this invention.

Sequencer 225 executes a process that initiates scanning of device endless new SCB queue 265, in start scan operation 751. The scan for a SCB to begin executing starts at head new SCB array site five (FIG. 8A) that is addressed by head new SCB site pointer 264. Specifically, sequencer 225 reads field Q_NEXT at SCB array site five in read Q_NEXT operation 752 and transfers processing to valid pointer check 753.

As described above, if field Q_NEXT at SCB array site five contains a valid pointer, there is a new SCB in head SCB array site five. Conversely, if field Q_NEXT has an invalid pointer, queue 265 does not contain an executable SCB. Thus, when check 753 finds a valid pointer, processing transfers from check 753 to executable check 755, and otherwise to done operation 754.

Executable check 755 determines whether the new SCB in site five can be executed at this time. The particular operations performed in executable check 755 are not essential to this invention, and are the same checks that would be performed by the prior art host adapter device. If the new SCB can be executed, check 755 transfers to head site check 756, and otherwise to read Q_NEXT operation 752.

Assuming that the new SCB at head site five is not currently executable by host adapter device 220, upon return to operation 752, sequencer 225 reads field Q_NEXT at SCB array site thirty-seven because site thirty-seven is addressed by the SCB site pointer in field Q_NEXT in head new SCB site five. Operation 752 transfers processing to valid pointer check 753.

As described above, if field Q_NEXT at SCB array site thirty-seven contains a valid pointer, there is another new SCB in device endless new SCB queue 265 in common SCB array 255. Conversely, if field Q_NEXT at site thirty-seven contains an invalid pointer, queue 265 has only one new SCB. Thus, when check 753 finds a valid pointer, processing transfers from check 753 to executable check 755, and otherwise to done operation 754.

Executable check 755 determines whether the second new SCB can be executed at this time. If the second new SCB can be executed, check 755 transfers to head site check 756, and otherwise to read Q_NEXT operation 752. Operations 752, 753, and 754 are repeated until either an executable SCB is found or the tail new SCB site in device endless new SCB queue 265 is reached.

Assuming that the second SCB in queue 265 is executable, check 755 transfers processing to head site check 756. Since the second SCB is not stored at head SCB array site five, i.e., the site addressed by device endless new SCB head pointer 264, check 756 transfers processing to remove SCB operation 758 that identifies the SCB in the second SCB site of queue 265 as executable, and transfers to mend queue operation 759.

Figure 8B:
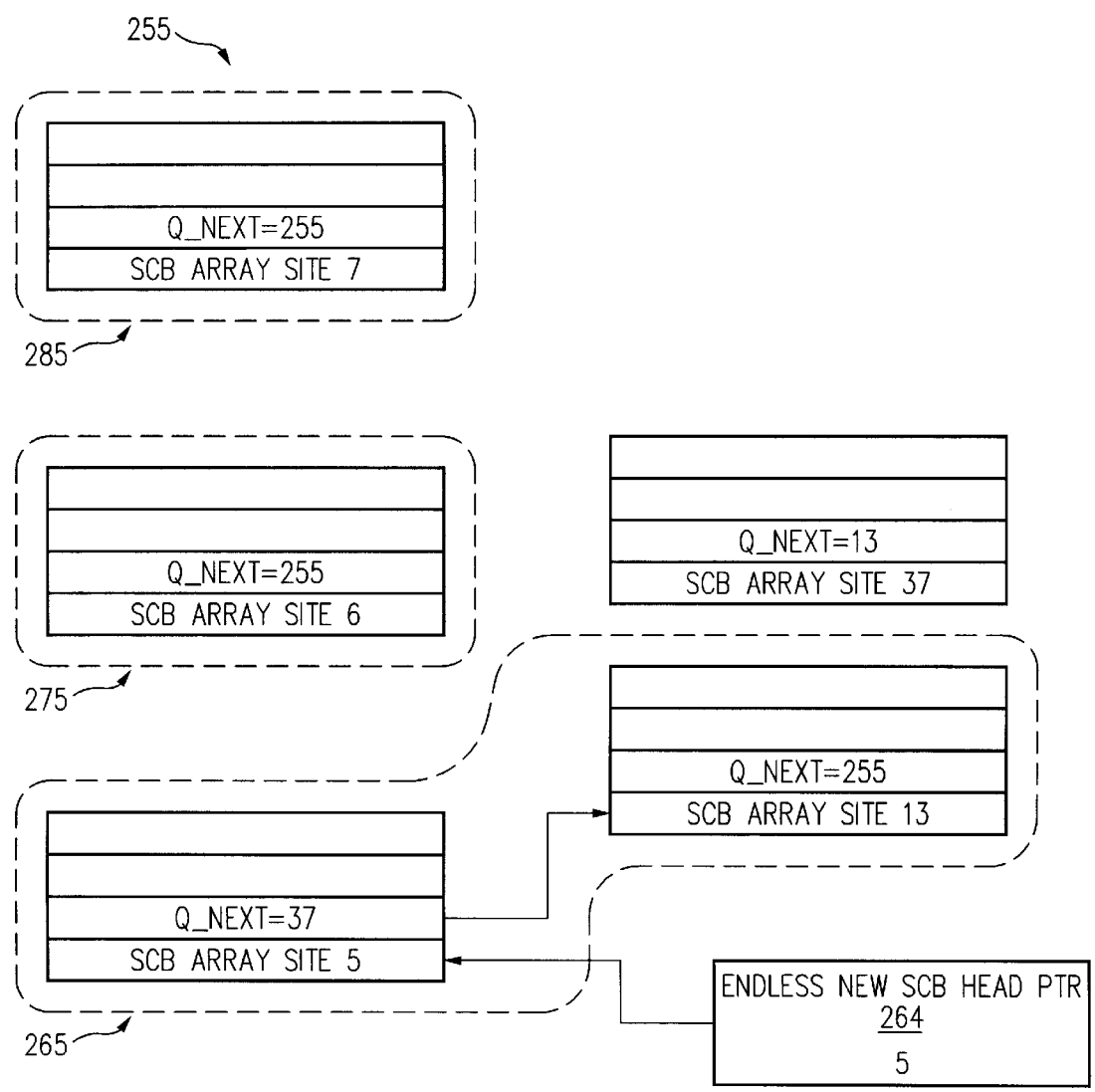

In mend queue operation 759, sequencer 225 moves the SCB site pointer in field Q_NEXT of the removed SCB, e.g., the value thirteen at site thirty-seven, to field Q_NEXT of the SCB site pointing to the removed SCB, e.g., field Q_NEXT of SCB array site five (FIG. 8B). Since the scan operation is completed, operation 759 transfers to done operation 754.

The previous example assumed that the SCB at site five was not executable at the time of that scan. Upon a subsequent initiation of process 750, operations 751 to 753 are performed identically to the above description, and check 753 transfers processing to executable check 755. If at this time the head SCB is executable, check 755 transfers processing to head site check 756 which in turn transfers processing to remove head SCB operation 757.

Figure 8C:
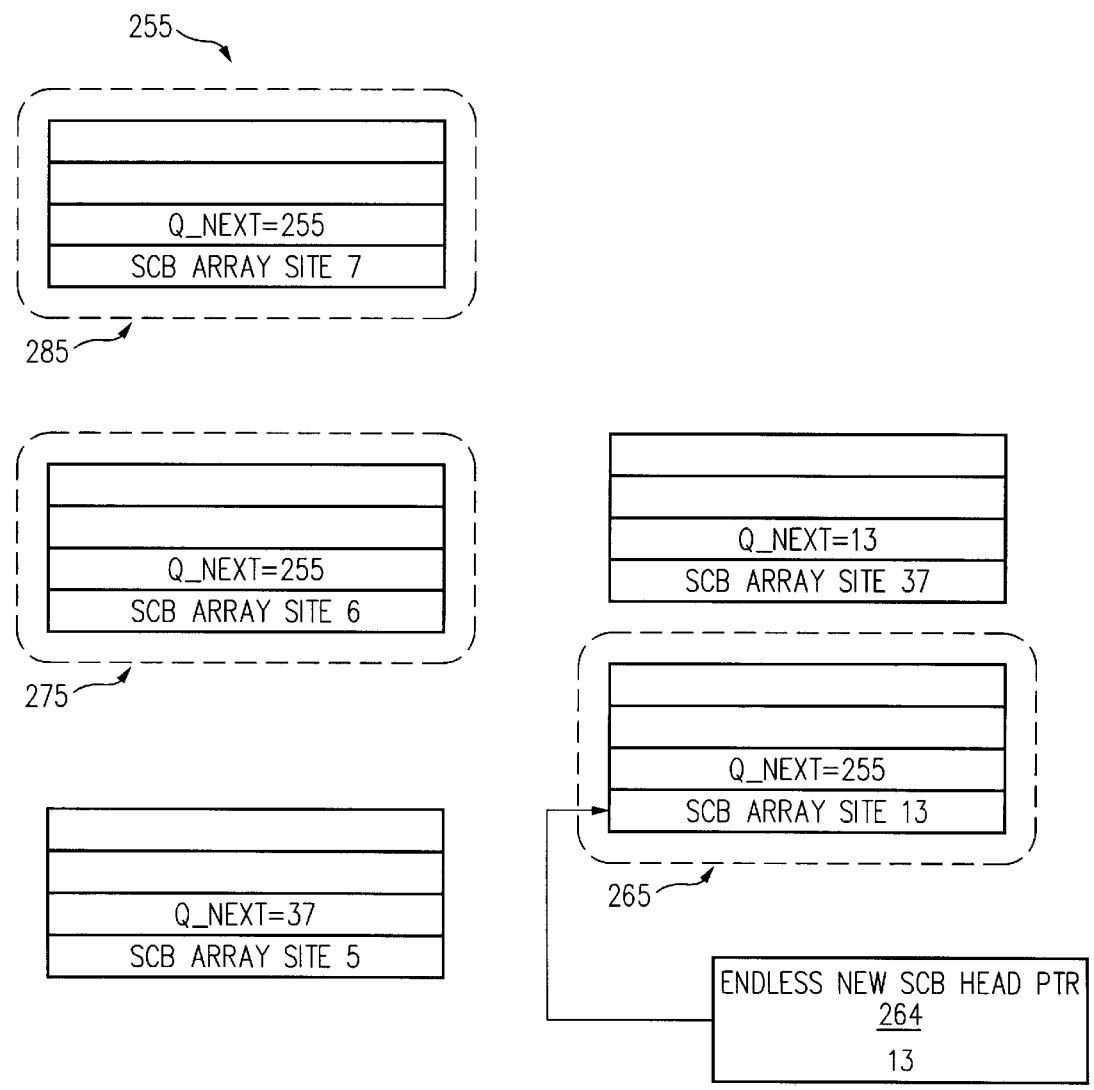

Remove head SCB operation 757 identifies the head SCB as executable and transfers processing to update pointer operation 760. In operation 760, sequencer 225 updates head new SCB site pointer 264 by moving the SCB site pointer in field Q_NEXT of the head new SCB site, e.g., value thirteen in this example, to head new SCB site pointer 264 (FIG. 8C). Operation 760 transfers processing to done operation 754.

Thus, sequencer 225 can remove SCBs from any array site in device endless new SCB queue 265 except the last site, i.e., the tail site. If sequencer 225 removes the SCB at the head new SCB site, sequencer 225 updates head new SCB site pointer 264 by moving the SCB site pointer in field Q_NEXT of the head new SCB site to head new SCB site pointer 264. If sequencer 225 removes any other SCB, sequencer 225 simply mends queue 265 by moving the SCB site pointer in field Q_NEXT of the removed SCB to field Q_NEXT of the SCB site pointing to the removed SCB. The operations of sequencer 225 are not visible to either HIM 202 or sequencer 245, and never leave queue 265 in an intermediate state as far as HIM 202 or sequencer 245 is concerned. Herein, sequencer 225 and the other sequencers are described as performing certain operations and checks. Those of skill in the art will appreciate that these operations and checks are performed in response to a processes executing on the sequencer.

The endless new SCB queue and SCB delivery process of this invention are particularly advantageous for host adapter devices with the following features:

A SCB delivery path 260 that is shared with data transfers, and traffic along delivery path 260 associated with SCB deliveries must be minimized;

A mechanism whereby HIM 202 can notify sequencer 245 of a new SCB in host endless new SCB queue 215, without pausing sequencer 245 and without sequencer 245 having to poll registers external to host adapter device 240;

The temporal relationship among SCBs generated by HIM 202 must be maintained throughout delivery of the SCBs to one or more devices; and The firmware for each of devices 220, 230, and 240 does not require knowledge of the other devices.

While one embodiment of this invention has been described, the principles of this invention can be used in a wide variety of host adapters configurations. The particular components and transfer processes, i.e., DMA transfers, described are illustrative only and are not intended to limit the invention to the specific features described.

I claim:

1. A method for management of hardware control blocks in a system having a host processor coupled to a plurality of devices by an I/O bus, said method comprising:

placing hardware control blocks in a host endless hardware control block queue in a host memory,
wherein each hardware control block includes a field specifying a storage site in an array of hardware control blocks in another memory;
said host endless hardware control block queue is maintained to never be empty and so has at least one storage site allocated to said host endless hardware control block queue following an initialization; and
a tail pointer delimiter for said host endless hardware control block queue is accessible only by a process executing on said host processor; and
transferring each hardware control block in order from said host endless hardware control block queue to said storage site in said array of hardware control blocks by only one device in said plurality of devices.

2. A method for management of hardware control blocks in a system having a host processor coupled to a plurality of devices by an I/O bus as in claim 1 further comprising:

maintaining a device endless hardware control block queue for each device in said plurality of devices in said array of hardware control blocks whereby a plurality of device endless hardware control block queues are maintained in said array of hardware control blocks.

3. A method for management of hardware control blocks in a system having a host processor coupled to a plurality of devices by an I/O bus as in claim 2 wherein said transferring each hardware control block further comprises transferring a hardware control block to a tail site of one device endless hardware control block queue in said plurality of device endless hardware control block queues, wherein said one endless hardware control block queue is an endless queue for a device that executes said hardware control block.

4. A method for management of hardware control blocks in a system having a host processor coupled to a plurality of devices by an I/O bus, as in claim 3 wherein said host endless hardware control block queue is a host endless new hardware control block queue.

5. A method for management of hardware control blocks in a system having a host processor coupled to a plurality of devices by an I/O bus as in claim 4 further comprising:

scanning said one device endless hardware control block queue by a process executing on a device processor of said device to determine whether said one endless hardware control block queue contains a hardware control block that can be executed.

6. A method for management of hardware control blocks in a system having a host processor coupled to a plurality of devices by an I/O bus as in claim 4, wherein said method further comprises:

leaving a head hardware control block pointer unchanged by a process executing on a device processor of said device when (i) said one device endless hardware control block queue contains a hardware control block that can be executed, and (ii) said hardware control block that can be executed is stored in a hardware control block storage site in said one device endless hardware control block queue other than a hardware control block storage site pointed to by said head hardware control block pointer.

7. A method for management of hardware control blocks in a system having a host processor coupled to a plurality of devices by an I/O bus as in claim 4 wherein said method further comprises:

removing a hardware control block, that can be executed and that is stored in a hardware control block storage site other than a hardware control block storage site addressed using said head hardware control block pointer, from said one device endless hardware control block queue for execution.

8. A method for management of hardware control blocks in a system having a host processor coupled to a plurality of devices by an I/O bus as in claim 7 wherein said method further comprises:

mending said one device endless hardware control block queue.

9. A method for management of hardware control blocks in a system having a host processor coupled to a plurality of devices by an I/O bus as in claim 4, wherein said method further comprises:

removing from said one device endless hardware control block queue for execution a hardware control block addressed using a head hardware control block pointer.

10. A method for management of hardware control blocks in a system having a host processor coupled to a plurality of devices by an I/O bus as in claim 4 wherein said method further comprises:

updating a head hardware control block pointer by a process executing on a device processor of said device when (i) said one device endless hardware control block queue contains a hardware control block that can be executed, and (ii) said hardware control block that can be executed is stored in a site addressed using said head hardware control block pointer.

11. A method for management of hardware control blocks in a system having a host processor coupled to a plurality of devices by an I/O bus, as in claim 1 wherein said host endless hardware control block queue is a host endless new hardware control block queue.

12. A method for management of hardware control blocks in a system having a host processor coupled to a plurality of devices by an I/O bus as in claim 11 wherein said method further comprises:

initializing said host endless new hardware control block queue by a device driver.

13. A method for management of hardware control blocks in a system having a host processor coupled to a plurality of devices by an I/O bus as in claim 11 wherein said method further comprises:

loading a hardware control block in a storage site in said host endless new hardware control block queue pointed to by a host endless new hardware control block queue tail pointer stored in a memory of said host processor, wherein said host endless new hardware control block queue tail pointer is managed by a device driver executing on said host processor, and said device driver is said process executing on said host processor; and said host endless new hardware control block queue tail pointer is said tail pointer delimiter.

14. A method for management of hardware control blocks in a system having a host processor coupled to a plurality of devices by an I/O bus as in claim 13 wherein said method further comprises:

allocating another storage site in said host endless new hardware control block queue.

15. A method for management of hardware control blocks in a system having a host processor coupled to a plurality of devices by an I/O bus as in claim 14 wherein said method further comprises:

loading a host next hardware control block field of said loaded hardware control block with a pointer to said another storage site in said host endless new hardware control block queue.

16. A method for management of hardware control blocks in a system having a host processor coupled to a plurality of devices by an I/O bus as in claim 14 wherein said method further comprises:

updating a count of hardware control blocks in said host endless new hardware control block queue.

17. A method of management of hardware control blocks in a system having a host processor coupled to a plurality of devices by an I/O bus as in claim 14, said method further comprising:

updating said host endless new hardware control block queue tail pointer to address said another storage site in said host endless new hardware control block queue.

18. A method of management of hardware control blocks in a system having a host processor coupled to a plurality of devices by an I/O bus as in claim 13, said method further comprising:

loading a device hardware control block storage site field of said loaded hardware control block with a value stored in a device endless new hardware control block tail pointer.

19. A method of management of hardware control blocks in a system having a host processor coupled to a plurality of devices by an I/O bus as in claim 18, said method further comprising:

allocating a storage site for another hardware control block in a device endless hardware control block queue in a device hardware control block array.

20. A method of management of hardware control blocks in a system having a host processor coupled to a plurality of devices by an I/O bus as in claim 19, said method further comprising:

loading a location of said storage site for said another hardware control block in a device endless hardware control block queue in a device hardware control block array in a device next hardware control block array site field of said loaded hardware control block.

21. A method for management of hardware control blocks in a system having a host processor coupled to a plurality of devices by an I/O bus as in claim 20 wherein said method further comprises:

updating a count of hardware control blocks in said host endless hardware control block queue.

22. A method of management of hardware control blocks in a system having a host processor coupled to a plurality of devices by an I/O bus as in claim 20, said method further comprising:

updating said host endless new hardware control block queue tail pointer to address said another storage site in said host endless hardware control block queue.

23. A method of management of hardware control blocks in a system having a host processor coupled to a plurality of devices by an I/O bus, said method comprising:

placing hardware control blocks in an endless queue in a first memory wherein said hardware control blocks are used by a device driver to control operations of a plurality of devices including host adapter devices wherein said endless queue is maintained to never be empty and so has at least one storage site allocated to said endless queue following an initialization; and transferring each hardware control block from said endless queue to a common array in a second memory via a DMA transfer controlled by only one device in said plurality of devices wherein said one device transfers each hardware control block to a tail site in an endless queue of a device in the plurality of devices that will execute the hardware control block wherein said endless queue of said device is maintained to never be empty and so has at least one storage site allocated to said endless queue of said device following an initialization.

* * * * *